(12) United States Patent
Berthezene et al.

(10) Patent No.: US 8,876,288 B2
(45) Date of Patent: Nov. 4, 2014

(54) PROGRESSIVE MULTIFOCAL OPHTHALMIC LENS

(75) Inventors: Marie-Anne Berthezene, Charenton-le-Pont (FR); Bernard Bourdoncle, Charenton-le-Pont (FR); Laurent Calixte, Charenton-le-Pont (FR); Cyril Guilloux, Charenton-le-Pont (FR); Soazic Mousset, Charenton-le-Pont (FR); Damien Paille, Charenton-le-Pont (FR)

(73) Assignee: Essilor International (Compagnie Generale d'Optique), Charenton-le Pont (FR)

( * ) Notice: Subject to any disclaimer, the term of this patent is extended or adjusted under 35 U.S.C. 154(b) by 180 days.

(21) Appl. No.: 13/578,050

(22) PCT Filed: Feb. 8, 2011

(86) PCT No.: PCT/IB2011/050529
§ 371 (c)(1),
(2), (4) Date: Oct. 18, 2012

(87) PCT Pub. No.: WO2011/098952
PCT Pub. Date: Aug. 18, 2011

(65) Prior Publication Data
US 2013/0038833 A1 Feb. 14, 2013

(30) Foreign Application Priority Data
Feb. 9, 2010 (FR) ...................................... 10 50897

(51) Int. Cl.
*G02C 7/06* (2006.01)
(52) U.S. Cl.
CPC ..................................... *G02C 7/063* (2013.01)
USPC ............. 351/159.76; 351/159.77; 351/159.42

(58) Field of Classification Search
CPC .......... G02C 7/06; G02C 7/061; G02C 7/063; G02C 7/065; G02C 7/066; G02C 7/068; G02C 7/022; G02C 7/024; G02C 7/025; G02C 7/027; G02C 7/028
USPC ............... 351/159.06, 159.17, 159.4, 159.43, 351/159.45, 159.42, 159.74, 159.75, 351/159.76, 159.77
See application file for complete search history.

(56) References Cited

U.S. PATENT DOCUMENTS

2006/0092375 A1* 5/2006 Menezes et al. ............... 351/168
2007/0008489 A1* 1/2007 Guillous et al. ............... 351/169
2010/0321633 A1* 12/2010 De Rossi et al. ............... 351/169

*Primary Examiner* — Darryl J Collins
*Assistant Examiner* — Gary O'Neill
(74) *Attorney, Agent, or Firm* — Polsinelli PC

(57) ABSTRACT

The invention relates to a finished or semi-finished lens which comprises: a disc containing all the points of the lens that have the same abscissa and the same ordinate as points located within a circle in the reference plane having a diameter of 30 millimeters and centered on the prism reference point; a progression length of less than 14.5 millimeters; a first specific point having a cylinder value equal to the maximum cylinder value of all the points of the lens located in the nasal area and in the disc; and a second specific point having a cylinder value equal to the maximum cylinder value of all the points of the lens located in the temporal area and in the disc; a first ratio between: the maximum gradient of the cylinder for the points of the lens that have the same abscissa and the same ordinate as the points located on segments connecting the mounting cross to the first and second specific points, and surface addition of less than 0.095 per millimeter; and a second ratio between: the maximum cylinder value of the first and second specific points, and surface addition of no more than 0.85. The invention enhances the comfort of the wearer.

14 Claims, 21 Drawing Sheets

PROGRESSIVE MULTIFOCAL OPHTHALMIC LENS

CROSS-REFERENCE TO RELATED APPLICATIONS

The present application is a national phase application under 35 U.S.C. 371 of PCT International Application No. PCT/IB2011/050529 filed on 8 Feb. 2011 and entitled Progressive Multifocal Ophthalmic Lens, which application claims priority to French Application No. 1050897 filed on 9 Feb. 2010. Both of the above-referenced applications are hereby incorporated by reference in their entirety for all that they disclose and teach.

The present invention relates to finished and semi-finished, progressive and multifocal, ophthalmic lenses having a complex surface comprising a far vision region, a near vision region, an intermediate vision region and a main meridian of progression passing through the three regions.

A spectacle wearer can be prescribed a positive or a negative power correction. For presbyopic wearers, the value of the power correction is different for far vision and for near vision, due to difficulty in accommodation for near vision. The prescription thus comprises a power value for far vision and a power addition representative of the power increment between far vision and near vision. The power addition is termed the prescribed addition. Ophthalmic lenses which compensate for presbyopia are multifocal lenses, the most suitable being progressive multifocal lenses.

Progressive multifocal ophthalmic lenses are now well known. Such lenses are used to compensate for presbyopia and allow the spectacle wearer to see objects over a wide range of distances, without having to remove his or her glasses. Progressive multifocal lenses typically have a far vision region, located in the top of the lens, a near vision region located in the bottom of the lens, an intermediate region connecting the near vision region and the far vision region, and a meridian passing through the three regions.

French patent application FR-A-2 699 294 discusses in its preamble the various elements of such a progressive multifocal ophthalmic lens as well as the work conducted by the applicant intended to improve the comfort of wearers of such lenses. Reference should be made to this document for details on these various points.

The applicant has also proposed, for example in the U.S. Pat. No. 5,270,745 or U.S. Pat. No. 5,272,495 to vary the meridian, notably the position of a near vision control point, depending on addition and ametropia.

The Applicant has also proposed various improvements to better meet the visual needs of presbyopic wearers and improve the comfort of progressive multifocal lenses, (U.S. Pat. No. 5,270,745, U.S. Pat. No. 5,488,442, FR-A-2 704 327).

Habitually, progressive multifocal lenses have an aspherical or complex surface, for example the surface opposite the wearer of the spectacles, and a spherical or toric surface, we call the prescription surface. The term aspherical surface should be taken to mean a surface that departs from the shape of a portion of a sphere. The spherical or toric surface allows the lens to be adapted to the wearer's ametropia, so that a multifocal lens is generally only defined by its complex surface. The definition of the lens is limited in such a case to seeking an optimized surface for the complex surface.

As is well known, such a complex surface is usually defined by the altitude of every point thereon. Use is also made of parameters established by the minimum and maximum curvatures at each point, or more commonly their half-sum and difference. This half-sum and the absolute value of the difference multiplied by a factor n−1, n being the refractive index of the material of the lens, are called mean sphere and cylinder.

Families of progressive multifocal lenses are defined, each lens of a family being characterized by an optical addition, which corresponds to the variation of power between the far vision region and the near vision region. More specifically, the optical addition, denoted $Add_{opt}$, corresponds to the power variation between a point L in the far vision region and a point P in the near vision region, which are respectively called the far vision reference point and near vision reference point, and which respectively represent the points of intersection of the gaze with the complex surface of the lens for vision at infinity and reading vision. For a lens surface, the surface addition $Add_{surf}$ can be expressed as the variation in mean sphere between the point L in the far vision region and the point P in the near vision region. The optical or surface addition then generally corresponds to the addition prescribed in the most common case where the lens comprises a complex surface and a spherical or toric surface.

Within the same family of lenses, addition varies from one lens to the other in the family between a minimum value of addition and a maximum addition value. Usually, the minimum and maximum values for addition are respectively 0.75 diopter and 3.5 diopters, and addition varies in 0.25 diopter steps from one lens to the other of the family.

In a family of lenses, lenses with the same addition may differ usually in terms of ametropia, at a reference point by the value of mean sphere, also called the base, measured on the face opposite the eye. One can for example choose to measure the base at reference point L for far vision.

For progressive multifocal lenses, by the choice of a pair (addition, base) we define a whole set of complex multifocal faces. Usually, we can define five values for the base and 12 values of addition giving sixty complex faces. For each pair (addition, base), a lens commonly called "semi-finished" the addition of which is provided by the complex surface by the change in curvature between the far vision region and the near vision region may be obtained. Such a lens has enough material to allow the manufacturer to machine the face opposite to the complex surface making it possible to obtain the desired lens prescription.

The ophthalmic prescription may include in addition to the power prescription a prescription for astigmatism. Such a prescription is made up of an axis value (in degrees) and an amplitude value (in diopters). The amplitude value represents the difference between the maximum and minimum power in a given direction for correcting the defect in eyesight of a wearer. According to the chosen convention, the axis represents the orientation of one of two powers with respect to a reference axis and in a direction of rotation defined by convention. In practice, the TABO convention is used. In this convention, the reference axis is horizontal and the direction of rotation is the clockwise direction for each eye, when looking at the wearer. A value of +45° for axis consequently represents an axis oriented obliquely, which, when looking at the wearer, extends from the quadrant situated at the upper right to the quadrant located at the lower left. Such a prescription of astigmatism is measured on the wearer when viewing in far vision. Astigmatism is the term used for the pair (magnitude, angle); although this is a misnomer, astigmatism is also sometimes used to designate the magnitude of astigmatism. The context enables the skilled person to understand which meaning is intended. It is also known to the skilled person that the prescription in power and astigmatism of a wearer are usually designated and denoted using the terms of sphere, cylinder and axis. Ophthalmic lenses correcting an astigmatism prescription of a wearer may consist of spherocylindrical surfaces.

Moreover, the laws of optics governing the path of rays result in the appearance of optical defects when the light rays move away from the central axis of any lens. These known defects which include among others a power defect and an astigmatism defect can be generically called obliquity defects of light rays. The person skilled in the art can compensate for these defects as shown in EP-A-0 990 939, U.S. Pat. No. 5,270,746 (EP-A-0 461 624) and WO-A-98 12590.

Multifocal ophthalmic lenses, regardless of the type to which they belong, inevitably present optical aberrations (resultant astigmatism, defects in power, prismatic deviations . . . ) that involve a relatively long period of adaptation and affect the comfort of vision, as regards both static and dynamic vision. By the term dynamic vision we mean the vision of objects moving in the field of view, resulting from motion or as a result of the lens wearer moving.

There is a need for a progressive multifocal lens to overcome the drawbacks mentioned above and more particularly to improve wearer comfort.

To this end, the invention provides a progressive multifocal ophthalmic lens comprising a complex surface having at every point thereon a value of mean sphere and a value of cylinder, the surface comprising:
  a far vision region having a reference point for far vision;
  a near vision region having a reference point for near vision;
  a surface addition defined as a difference in mean sphere between the reference point for near vision and the reference point for far vision;
  an intermediate vision region between the far vision region and the near vision region;
  a main meridian of progression passing through the three regions and dividing the surface into a temporal region and a nasal region, a portion on the meridian passing through the far vision region defining a vertical axis;
  a fitting cross;
  a prism reference point in the center of a segment connecting micro-engravings, the prism reference point defining, with the vertical axis of the meridian and the horizontal axis connecting the micro-engravings, a reference frame, the reference frame making it possible to define each of the points on the lens by a value on the y-axis relative to the vertical axis and a value on the x-axis relative to the horizontal axis, the prism reference point having a value of zero on the x-axis and on the y-axis;
  a disc grouping together all points on the lens having the same value on the x-axis and the same value on the y-axis as points situated within a circle in the plane of said reference frame of 50 mm diameter and centered on the prism reference point,
  a progression length less than 14.5 mm, progression length being defined as a difference between the value on the y-axis of the fitting cross and the value on the y-axis of the point on the meridian where variation in mean sphere with respect the value of mean sphere at the reference point for far vision reaches 85% of surface addition;
  a difference in ratio between value of cylinder and surface addition less than 0.2 in absolute value for every pair of points on the lens symmetrical with respect to the fitting cross and having the same y-axis value as the fitting cross, and an x-axis value less than 20 millimeters in absolute value;
  a first specific point having a value of cylinder equal to the maximum cylinder value from among the set of points on the lens located inside the nasal region and within the disc and,
  a second specific point having a value of cylinder equal to the maximum cylinder value from among the set of points on the lens located inside said temporal region and within the disc;
  a first ratio between:
    maximum slope of cylinder for points on the lens having the same value on the x-axis and the same value on the y-axis as the points on the segments connecting the fitting cross to the first and second specific points and surface addition
  which is less than 0.095 per millimeter, and
  a second ratio between:
    maximum value of cylinder for the first and second specific points and
    surface addition
  which is less than or equal to 0.85.

Depending on the particular embodiment, the lens may include one or several of the following characteristics:
  a difference in ratio between the value of cylinder and surface addition is less than 0.1 in absolute value for each pair of points on the lens that are symmetrical with respect to the fitting cross and having the same value on the y-axis as the fitting cross and an x-axis value less than 20 millimeters in absolute value.
  the first ratio is less than 0.090 per millimeter.
  the second ratio is less than or equal to 0.75.
  the progression length is less than 13.5 millimeters.
  the lens is a finished or semi-finished lens.

The invention also provides a progressive multifocal ophthalmic lens for a wearer for whom an addition has been prescribed, the lens having:
  for each direction of gaze, a power and a resultant astigmatism for standard wearing conditions, each direction of gaze corresponding to an angle of lowering of gaze and an azimuth angle;
  the lens comprising:
  a far vision region having a reference point for far vision corresponding to a reference direction of gaze for far vision;
  a near vision region having a reference point for near vision corresponding to a reference direction of gaze for near vision;
  an intermediate vision region between the far vision region and the near vision region;
  a main meridian of progression passing through the three regions and dividing the lens into a temporal region and a nasal region;
  a fitting cross corresponding to a primary direction of gaze having an angle of lowering of gaze equal to zero and an azimuth angle of zero;
  a progression length less than 29°, progression length being defined as a difference in angle between the primary direction of gaze and an angle of lowering of gaze passing through the meridian for which wearer optical power variation with respect to wearer optical power value at the reference point for far vision reaches 85% of the prescribed addition;
  a first specific direction for which resultant astigmatism is a maximum resultant astigmatism value for the complete set of directions of gaze passing through the nasal region and through an angular disc of diameter 100° centered on the primary direction of gaze, the first direction having a first angle of lowering of gaze and a first azimuth angle;

a second direction for which resultant astigmatism is a maximum resultant astigmatism value the complete set of directions of gaze passing through the temporal region and through the disc, the second direction having a second angle of lowering of gaze and a second azimuth angle;

a first ratio between:
  a maximum slope of resultant astigmatism and prescribed addition
  less than 0.043 per degrees for direction of gaze passing through:
    the nasal region and having an angle of lowering of gaze and an azimuth angle such that the absolute value of the azimuth angle is less than the absolute value of the first azimuth angle and such that the product of the first angle of lowering of gaze and the azimuth angle is equal to the product of the first azimuth angle and the angle of lowering of gaze, and
    the temporal region and having an angle of lowering of gaze and an azimuth angle such that the absolute value of the azimuth angle is less than the value of the second azimuth angle and such that the product of the second angle of lowering of gaze and the azimuth angle is equal to the product of the second azimuth angle and the angle of lowering of gaze, and a second ratio between:
  a maximum value of resultant astigmatism for all the directions of gaze passing through the disc and
  prescribed addition
  less than or equal to 1.

Depending on the particular embodiment, the lens can include one or more of the following characteristics:
the first ratio is less than 0.038 per degree.
the second ratio is less than or equal to 0.85.
progression length is less than 27°.
a difference in ratio between the value of resultant astigmatism and prescribed addition of less than 0.3 in absolute value for any pair of directions of gaze which are symmetrical with respect to the primary direction of gaze and having an angle of lowering of gaze of zero an azimuth angle less than 52° in absolute value.
a difference in ratio between the value of resultant astigmatism and prescribed addition is less than 0.1 in absolute value for any pair of direction of gaze which are symmetrical with respect to the primary direction of gaze and having an angle of lowering of gaze equal to zero and an azimuth angle less than 52° in absolute value.

The invention also provides a visual equipment including a lens according to one of the embodiments described above.

Other features and advantages of the invention will become apparent on reading the following detailed description of embodiments of the invention given by way of example only and with reference to the drawings which show in:

FIGS. 1 to 3, diagrammatic representations of a lens and eye optical system;

FIGS. 4 to 6, characterizations in surface terms of an exemplary lens;

FIGS. 7 to 9, characterizations in surface terms of an exemplary lens;

FIGS. 10 to 12, characterizations in surface terms of an exemplary lens;

FIGS. 13 to 15, characterizations in optical terms of an exemplary lens;

FIGS. 16 to 18, characterizations in optical terms of an exemplary lens;

FIGS. 19 to 21, characterizations in optical terms of an exemplary lens.

There is provided a progressive multifocal lens having particular characteristics. Such a lens provides a soft transition between far vision and intermediate vision region.

It is proposed to define the characteristics of lenses in terms of mean sphere and cylinder. Thus, as known per se, at any point on an aspherical surface, a mean sphere SPH can be defined by the following formula:

$$SPH = \frac{n-1}{2}\left(\frac{1}{R_1} + \frac{1}{R_2}\right)$$

wherein R1 and R2 are the maximum and minimum radii of curvature expressed in meters, and n is the refractive index of the material constituting the lens.

Cylinder CYL can also be defined by the formula:

$$CYL = \frac{n-1}{2}\left|\frac{1}{R_1} - \frac{1}{R_2}\right|$$

The characteristics of the complex face of the lens can be expressed using the mean sphere and cylinder.

Moreover, a progressive multifocal lens can also be defined by optical characteristics taking into account the situation of the wearer of the lenses.

In the remainder of the description, reference is made to terms such as "top", "bottom", "horizontal", "vertical", "above", "below" or other words indicating relative positions. It will be understood that these terms should be understood under the wearing conditions of the lens and they are to take reference with respect to the prism reference point $P_{PRP}$ when dealing with a surface or with respect to the fitting cross in the case of the lens. The prism reference point $P_{PRP}$ and the fitting cross are defined below.

FIGS. 1-2 show diagrams of eye and lens optical systems, to illustrate the definitions used in the description. Specifically, FIG. 1 is a diagram showing a perspective view of such a system illustrating the parameters α and β used to define a direction of gaze. FIG. 2 is a view in a vertical plane parallel to the antero-posterior direction of the wearer's head and passing through the center of rotation of the eye in a case where the parameter β is 0.

Q' is called the center of rotation of the eye; axis Q'F', shown in FIG. 2 in phantom, is the horizontal axis through the center of rotation of the eye and extending in front of the wearer—in other words the axis Q'F' corresponds to the primary direction of gaze. This axis intersects the complex surface of the lens at a point called the fitting cross, which is marked on the lenses to allow positioning of the lenses by an optician. We define the point O, the point of intersection of the rear surface of the lens and the axis Q'F'. We define a sphere of vertices, center Q', and a radius q', which is tangent to the back surface of the lens at a point on the horizontal axis. For example, a radius value q' of 25.5 mm corresponds to a commonly occurring value and provides satisfactory results when the lenses are worn.

A given direction of gaze—shown in solid lines in FIG. 3—corresponds to a position of the eye in rotation about Q' and a point J on the sphere of vertices, the angle β is the angle between the axis Q'F' and the projection of the straight line Q'J on the horizontal plane containing the axis Q'F'; this angle appears in the diagram of FIG. 1. The angle α is the angle formed between the axis Q'J and the projection of the straight line Q'J on the horizontal plane containing the axis Q'F; this angle appears in the diagrams of FIGS. 1 and 2. A given direction of gaze consequently corresponds to a point J on the sphere of vertices or to a pair ($\alpha$, $\beta$). The more the value of the angle of gaze lowering $\alpha$ is positive, the greater is the lowering of gaze and the more negative this value is, the more the gaze is raised.

The image of a point in the object space in a direction of gaze, and at a given object distance, is formed between two points S and T corresponding to minimum and maximum focal lengths, which are tangential and sagittal focal lengths in the case of surfaces of revolution. On the optical axis, the image of a point in the object space at infinity is formed at F'. Distance D is the focal length of the eye-lens system.

We use the term ergorama to describe a function associating with each direction of gaze the usual distance of the object point. Typically, for far vision in the primary direction of gaze, the object point is at infinity. In near vision, in a direction substantially corresponding to an angle $\alpha$ of the order of 35° and at an angle $\beta$ in absolute value of the order of 5° to the nasal side, the object distance is of the order of 30 to 50 cm. For more details on a possible definition of an ergorama, reference can be made to FR-A-2753805 (U.S. Pat. No. 6,318,859). This document describes an ergorama, its definition and modeling process. One particular ergorama involves only taking points at infinity. For the method of the invention, one can consider the points at infinity or not. The ergorama may also be dependent on the wearer's ametropia.

Using these elements, we can define a power and an astigmatism, in each direction of gaze. For a direction of gaze ($\alpha$, $\beta$), we consider an object point M at a given object distance given by the ergorama. In the object space, we define, for the point M on the corresponding light ray, an object proximity ProxO as the inverse of the distance between point M and point J on the sphere of vertices:

$$ProxO = 1/MJ$$

This makes it possible calculation of the object proximity in the context of a thin lens approximation at any point on the sphere of vertices, which is used for the determination of the ergorama. For an actual lens, it is possible by using a ray tracing program to consider the object proximity as the inverse of the distance between the object point and the front surface of the lens, on the corresponding ray.

Still for the same direction of gaze ($\alpha$, $\beta$), the image of a point M having a given object proximity is formed between two points S and T corresponding respectively to minimum and maximum focal lengths (which would be sagittal and tangential focal lengths in the case of surfaces of revolution). We shall call image proximity of the point M, the amount ProxI:

$$ProxI = \frac{1}{2}\left(\frac{1}{JT} + \frac{1}{JS}\right)$$

By analogy with the case of the thin lens, this defines, in a given direction of gaze and for a given object proximity, i.e. for a point in object space on the corresponding light ray, an optical power Pui as the sum of the image proximity and the object proximity.

$$Pui = ProxO + ProxI$$

Using the same notations, we define in each direction of view and for a given object proximity, an astigmatism Ast as $$Ast = \left|\frac{1}{JT} - \frac{1}{JS}\right|$$

This definition corresponds to the astigmatism of the beam of light rays created by the lens. Note that the definition provides, in the primary direction of gaze, the classical value of astigmatism. The angle of the astigmatism commonly called axis is the angle $\gamma$. The angle $\gamma$ is measured in the reference frame $\{Q', x_m, y_m, z_m\}$ linked to the eye. It corresponds to the angle at which the image S or T is formed depending on the convention used with respect to the direction $z_m$ in the plane $(Q', z_m, y_m)$. This gives the possible definitions of the optical power and astigmatism of the lens in the wearing conditions, which can be calculated as explained in the article by B. Bourdoncle et al, "Ray tracing through progressive ophthalmic lenses," 1990 International Lens Design Conference, D T Moore ed., Proc. Soc. Photo. Opt. Instrum. Eng. Standard wearing conditions should be taken to mean the position of the lens with respect to the eye of an average wearer, defined in particular by a pantoscopic angle of −8°, a lens-eye distance of 12 mm, a curve of the spectacle frame of 0°. We could also use other conditions. Wearing parameters can be calculated using a ray tracing program, for a given lens. Optical power and astigmatism can also be calculated so that the prescription is satisfied at the reference point for far vision either for a wearer wearing his or her glasses under wearing conditions or as measured using a frontofocometer.

FIG. 3 is a perspective view in a configuration where the parameters $\alpha$ and $\beta$ are nonzero. This highlights the effect of rotation of the eye by showing a fixed reference frame $\{x, y, z\}$ and a reference frame $\{x_m, y_m, z_m\}$ linked to the eye. The reference frame $\{x, y, z\}$ has its origin at the point Q'. The x-axis is the axis Q'O and is oriented from the lens towards the eye. The y-axis is vertical and orientated upwardly. The z-axis is such that the reference frame $\{x, y, z\}$ is direct orthonormal. The reference frame $\{x_m, y_m, z_m\}$ is linked to the eye and is centered on the point Q'. Axis $x_m$ corresponds to the direction JQ' of gaze. Thus, for the primary direction of gaze, the two reference frames $\{x, y, z\}$ and $\{x_m, y_m, z_m\}$ coincide. It is thus known that the properties of a finished lens can be characterized in several ways, notably as regards surface and optically. Surface characterization is thus equivalent to an optical characterization. In the case of a semi-finished lens, only a surface characterization can be used, given that optical characterization assumes that the lens was machined to the prescription of a wearer. On the contrary, in the case of an ophthalmic lens, the characterization can be either in terms of surface or optical, the two characterizations making it possible to describe the same object from two different perspectives.

Surface quantities are expressed relative to points. The points are located using an x-axis or a y-axis in a reference frame whose origin is usually the prism reference point $P_{PRP}$. The manufacturer of the lens is required to mark the prism reference point so that any optician can determine the values of prism for the lens. The prism measured at this point is then the resultant of prescribed prism and the prism used for machining. The prism reference point usually corresponds to the middle of micro-engravings on the lens. The manufacturer of the lens is also required to mark such micro-engravings in this situation.

Quantities in optics are expressed for directions of gaze. Directions of gaze are usually referenced in terms of lowering of gaze and azimuth in a reference frame whose origin is the center of rotation of the eye. When the lens is mounted in front of the eye, the fitting cross is placed in front of the pupil of the eye for a primary position of gaze. The term primary position of gaze should be taken to mean the situation where a wearer is looking straight ahead. In the selected reference frame, the fitting cross corresponds to an angle of lowering of gaze of 0° and an azimuth of 0°.

On the lenses of the Applicant, the direction of gaze passing through the fitting cross is situated 8° above the direction passing through the prism reference point, or, in the case of a surface characterization of the lens, 4 mm above the geometric center (0, 0) of the lens. Other positions of the fitting cross however can be considered provided they correspond to the primary position of gaze previously defined. In addition, it will be observed that when the prism reference point is the midpoint of micro-engravings on the lens, knowledge of the micro-engravings makes it possible to simultaneously have a reference point both for prism and for the fitting cross.

We shall now study the surface making it possible to obtain greater comfort for the wearer in a section dealing with surface characterization. Then we will study how to express in optical terms the surface properties for a lens having this surface in a section dealing with optical characterization.

Surface Characterization

We shall consider a progressive multifocal ophthalmic lens comprising an aspherical surface having at every point thereon a value of mean sphere and a value of cylinder as defined above. The surface comprises a far vision region having a far vision reference point and a near vision region having a near vision reference point. The surface also includes a surface addition $\text{Add}_{surf}$ defined as the difference in mean sphere between the reference point for near vision and the reference point for far vision, and an intermediate vision region located between the far vision region and the near vision region. The surface includes a main meridian of progression passing through the three regions and dividing the surface into a temporal region and a nasal region. A portion on the meridian passing through the far vision region defines a vertical axis. The lens also includes a fitting cross $C_M$ and a prism reference point $P_{PRP}$. The prism reference point $P_{PRP}$ defines with the vertical axis of the meridian and the horizontal axis linking the micro-engravings, a reference frame. This reference frame is used to define each of the points on the lens by a value on the y-axis relative to the vertical axis and a value on the x-axis relative to the horizontal axis. The prism reference point has a value of zero on the x-axis and a value of zero on the y-axis. As explained above, the lens can be a finished lens or a semi-finished lens blank.

The lens satisfies a first surface condition we call "surface condition 1". According to the "surface condition 1", the lens has a progression length less than 14.5 mm. The progression length is defined as the difference between the value on the y-axis of the fitting cross and the value on the y-axis of the point on the meridian where mean sphere variation with respect to the value of the mean sphere at the reference point for far vision is 85% of surface addition. This improves wearer comfort over a vertical eye-head strategy, the eye needing to move less in the vertical direction to obtain a correction appropriate for near vision. This effect is further increased if the lens satisfies a "surface condition 1bis", that is to say, if the lens has a progression length less than 13.5 mm.

The lens also satisfies a second surface condition we call "surface condition 2". We define on the lens a disc grouping together all the points on the lens having the same value on the x-axis and the same value on the y-axis as points inside a circle in the plane of the reference frame, 50 millimeters in diameter and centered on the prism reference point $P_{PRP}$. We further define a first specific point $N_{CmaxN}$ having a value of cylinder equal to the maximum cylinder value for all points on the lens located inside the nasal region and inside the disc. We further defines a second specific point $T_{CmaxT}$ having a value of cylinder equal to the maximum cylinder value for all points on the lens located inside said temporal region and inside the disc. When we say that a lens satisfies "surface condition 2" we mean that a lens has a first ratio between maximum slope of cylinder for points on the lens having, firstly, the same value on the x-axis and y-axis same as points located on the segments connecting the fitting cross $C_M$ to the first and second specific points $N_{CmaxN}$ and $T_{CmaxT}$, and, secondly, a surface addition $\text{Add}_{surf}$ less than 0.095 per millimeter. This first ratio is noted hereinafter Rsurfacique2. Such a condition helps to limit the change in slope of cylinder at the edge of the far vision region, which improves dynamic vision, while facilitating the transition from the far vision region to the intermediate vision region. The comfort of the wearer is thereby increased. This effect is further increased if the lens satisfies a "surface condition 2bis" that is to say if the lens has a first ratio Rsurfacique2 less than 0.090 per millimeter.

The lens also satisfies a third condition we call "surface condition 3." When a lens has "surface condition 3", it has a second ratio between, firstly, the maximum value of cylinder for the first and second specific points $N_{CmaxN}$ and $T_{CmaxT}$ and, secondly, addition, less than or equal to 0.85. This first ratio is denoted hereinafter Rsurfacique3. This makes it possible to control cylinder on the disc grouping together all the points on the lens having the same value on the x-axis and on the y-axis as points located inside a circle in the plane of the reference frame 50 to millimeters in diameter and centered on the prism reference point $P_{PRP}$. Aberrations and the resultant astigmatism in particular for all points on the disc are reduced. The wearer's vision on this disc is thus improved. The result is greater comfort for the wearer. This effect is further increased if the lens satisfies a "surface condition 3bis" that is to say, if the lens has a second ratio Rsurfacique3 less than or equal to 0.75.

The lens of the invention therefore satisfies surface conditions 1, 2 and 3 as defined above. This combination allows the lens to provide a soft transition between the far vision region and the intermediate vision region without degrading performance. Wearer comfort is improved. In particular, adaptation to lenses is easier where a lens has a soft transition between the far vision region and the intermediate vision region.

The lens also satisfies a fourth surface condition we call "surface condition 4". According to "surface condition 4", the lens has a difference in ratio denoted Dsurfacique4 between the value for cylinder and the addition $\text{Add}_{surf}$ less than 0.2 in absolute value for every pair of points on the lens that are symmetrical with respect to the fitting cross $C_M$ and having the same value on the y-axis as the fitting cross $C_M$, the value on the x-axis of each point being less than 20 millimeters in absolute value. This ensures a certain symmetry of distribution of cylinder at the height of the fitting cross. This makes it possible to improve binocular vision for the wearer in far vision. Such a condition ensures optimum comfort for the wearer in far vision. Indeed, when the wearer looks into the distance slightly shifting the eyes horizontally, he will be looking through the nasal portion of a lens with one eye and through the temporal portion of the other lens with the other eye. However, good binocular balance is achieved if the perceived qualities are much the same for each eye. This situation corresponds to perceived optical aberrations being essentially identical for both eyes. By ensuring that the values of cylinder normalized to the surface addition are substantially symmetrical on both sides of the fitting cross, the left eye and right eye of the wearer encounter substantially the same optical defects. A good balance of perception between the eyes for far vision is thus assured since the horizontal region at the fitting cross height is the one on which most demands are made by a wearer gazing at a point for far vision while shifting the eyes laterally. This effect is further increased if the lens satisfies a "surface condition 4bis", that is to say, if the lens has a difference in ratio between the value for cylinder and surface addition of less than 0.1 absolute value for every pair of points on the lens which are symmetrical with respect to the fitting cross $C_M$ located at the same y-axis value as the fitting cross $C_M$, the x-axis value of each point being limited to 20 millimeters in absolute value.

Such a lens surface satisfying the conditions 1, 2, 3 and 4 as defined above therefore has improved comfort compared to a lens surface satisfying conditions 1, 2 and 3.

As an illustration, three lenses numbered 1 to 3 can be considered. Lens 1 has an addition of 1.25 diopters, lens 2 an addition of 2.00 diopters and lens 3 an addition of 2.75 diopters. According to Examples 1 to 3, the complex surface satisfying the surface conditions 1, 2 and 3 is carried by the front face of the lens but it is understood that the complex surface may also be incorporated into the rear face of the lens.

FIGS. 4 to 6 show representations of the surface characteristics of the front surface of the lens 1. FIG. 4 shows mean isosphere lines for the front surface of the lens, the axes are graduated in mm; FIG. 5 shows isocylinder lines with the same axes. Isosphere lines are lines formed by the projection onto a plane tangent to the progressive surface at $P_{PRP}$ for points on the surface having a mean sphere of the same value. Similarly, we call isocylinder lines, lines formed by the projection on the above plane of points on the surface having a cylinder at the same value. FIG. 6 shows variation of sphere with respect to the reference point for far vision along the meridian, with the definition given above for sphere. The solid line shows the variation of mean sphere with respect to the reference point for far vision, and the dashed lines show variation in minimum sphere $(n-1)/R_1$ compared to the reference point for far vision and the variation in maximum sphere $(n-1)/R_2$ relative to the reference point for far vision.

In FIG. 5, the first and second specific points $N_{CmaxN}$ and $T_{CmaxT}$ are identified. Also shown in FIG. 5 is a circle of diameter 50 mm centered on the prism reference point as well as segments connecting the fitting cross $C_M$ to the first and second specific points $N_{CmaxN}$ and $T_{CmaxT}$.

FIG. 8 includes the same circles and segments as those shown in FIG. 5.

FIG. 11 includes the same circles and segments as those shown in FIGS. 5 and 8.

Figure 1:
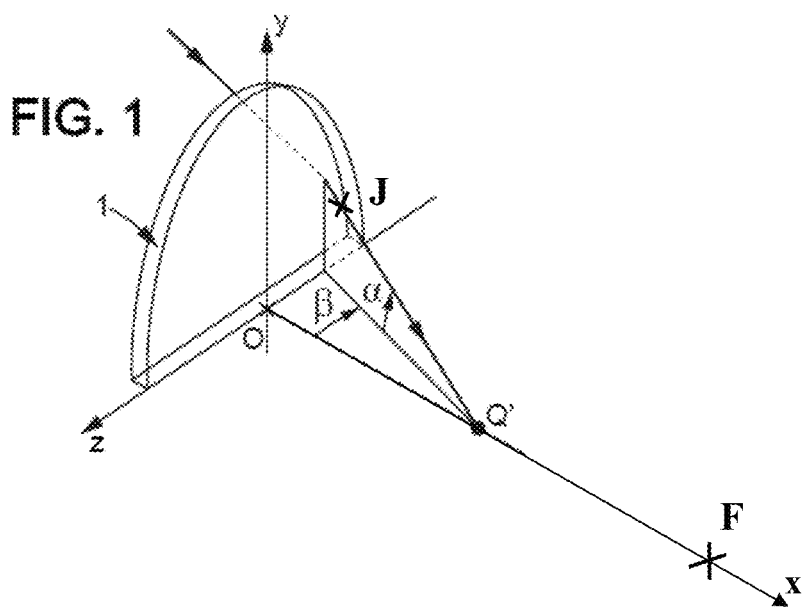

Table 1 shows the values of progression length for the three examples of lenses.

TABLE 1

Value of progression length for three examples of lenses.

| Example of Lens considered | Lens Type | Addition | Progression length (mm) |
|---|---|---|---|
| Example 1 | finished lens | 1.25 diopter | 13.48 |
| Example 2 | finished lens | 2.00 diopters | 13.48 |
| Example 3 | finished lens | 2.75 diopters | 13.52 |

For each of Examples 1 to 3, the progression length is less than 14.5 millimeters. Surface condition 1 is consequently well satisfied for the lenses of the considered examples. In addition, the lenses of Examples 1 and 2 show a progression length less than 13.5 millimeters; therefore they satisfy surface condition 1bis and provide improved comfort for the wearer when accessing near vision.

Furthermore, the values for the first characteristic ratio Rsurfacique2 and the second characteristic ratio Rsurfacique3 are given in Table 2 for the three examples of lenses.

TABLE 2

Surface ratios Rsurfacique2 and Rsurfacique3 for three examples of lenses.

| Example of lens considered | Lens Type | Addition | Rsurfacique2 | Rsurfacique3 |
|---|---|---|---|---|
| Example 1 | finished lens | 1.25 diopters | 0.078/mm | 0.72 |
| Example 2 | finished lens | 2.00 diopters | 0.085/mm | 0.68 |
| Example 3 | finished lens | 2.75 diopters | 0.087/mm | 0.74 |

For each of Examples 1 to 3, the ratio Rsurfacique2 is less than 0.095/mm. Surface condition 2 is well satisfied by the lenses of the examples considered.

In addition, the ratio Rsurfacique3 is less than 0.85. Surface condition 3 is well satisfied by the lenses of the examples considered.

The three examples of lenses considered therefore fulfill the combination of surface conditions 1, 2 and 3.

In addition, the lens of Example 1 has a ratio Rsurfacique2 less than 0.085/mm. This means that the lens of Example 1 also satisfies surface condition 2bis and shows a further improvement in comfort compared to a lens the surface of which satisfies surface conditions 1, 2 and 3.

The lenses of Examples 1, 2 and 3 also exhibit a ratio Rsurfacique3 less than 0.75. This means that they also fulfill surface condition 3bis and show further improved comfort compared to a lens the surface of which satisfies the surface conditions 1, 2 and 3.

In addition, the value Dsurfacique4 of the maximum difference in ratio between the value of cylinder and the addition provided by the surface in absolute value for every pair of points on the lens which are symmetrical with respect to the fitting cross and has the same y-axis value as the fitting cross and a value on the x-axis less than 20 millimeters in absolute value is given for each of the three examples of lenses in Table 3.

TABLE 3

Value of Dsurfacique4 for three examples of lenses.

| Example of lens considered | Lens Type | Addition | Dsurfacique4 |
|---|---|---|---|
| Example 1 | finished lens | 1.25 diopters | 0.040 |
| Example 2 | finished lens | 2.00 diopters | 0.045 |
| Example 3 | finished lens | 2.75 diopters | 0.058 |

For each of Examples 1 to 3, the value of Dsurfacique4 is less than 0.2. This means that each of the lenses satisfies the surface condition 4 and exhibits further improved comfort with respect to a lens whose surface satisfies surface conditions 1, 2 and 3. In addition, the lenses of Examples 1, 2 and 3 have a Dsurfacique4 value less than 0.1, they consequently also satisfy surface condition 4bis and provide additional comfort for the wearer.

Optical Characterization

Figure 2:
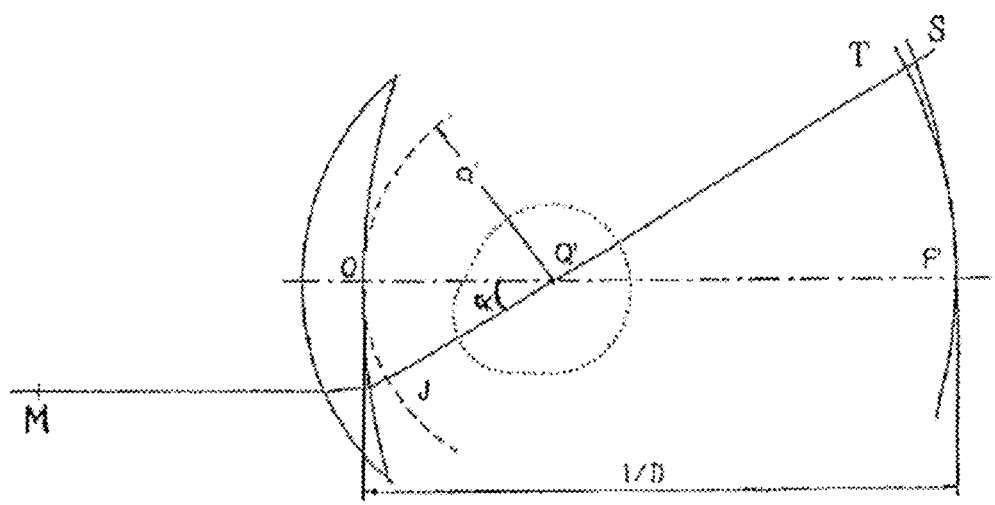
Figure 3:
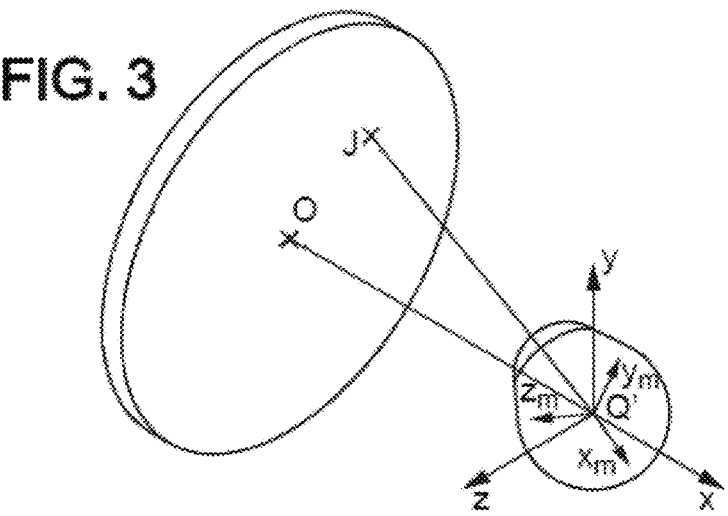
Figure 4:
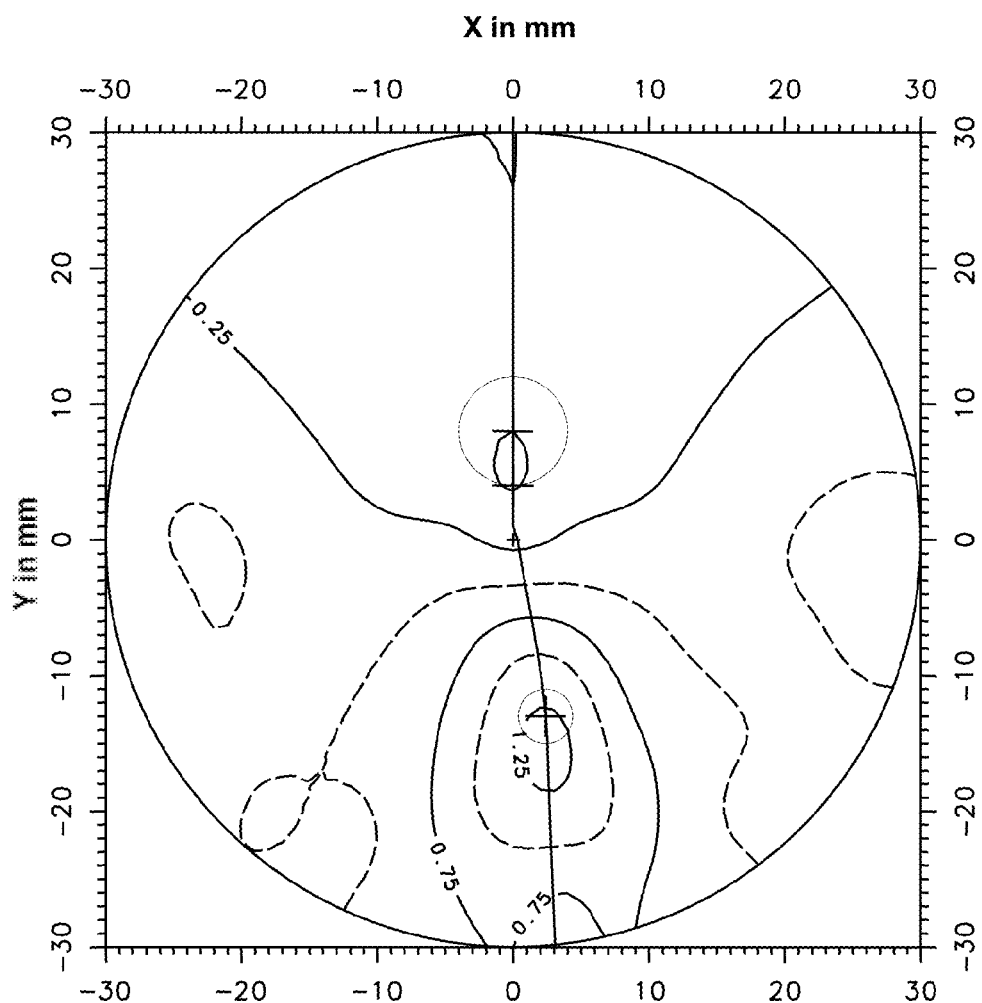
Figure 5:
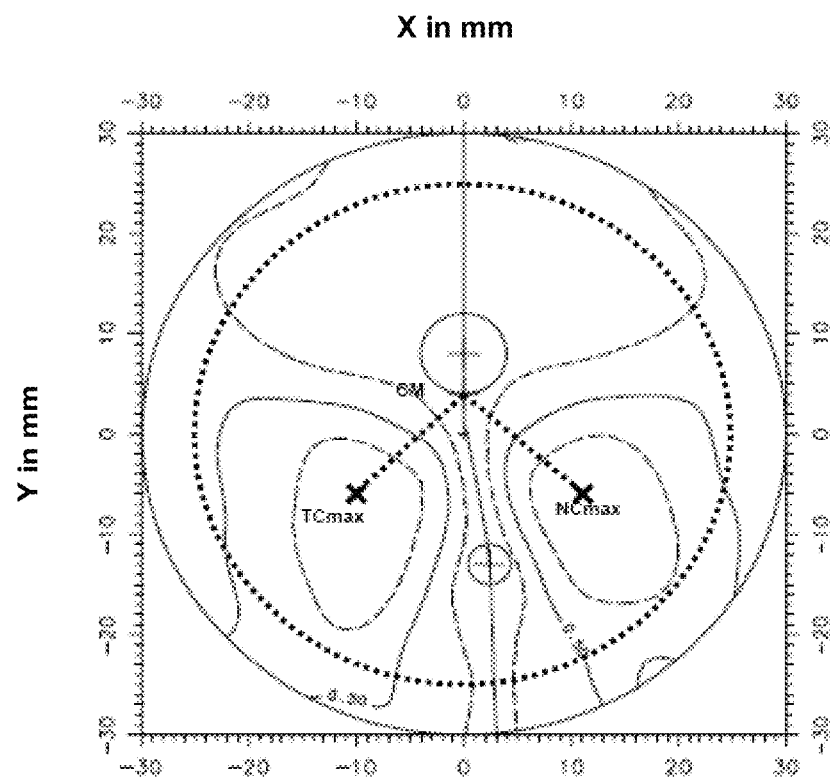
Figure 6:
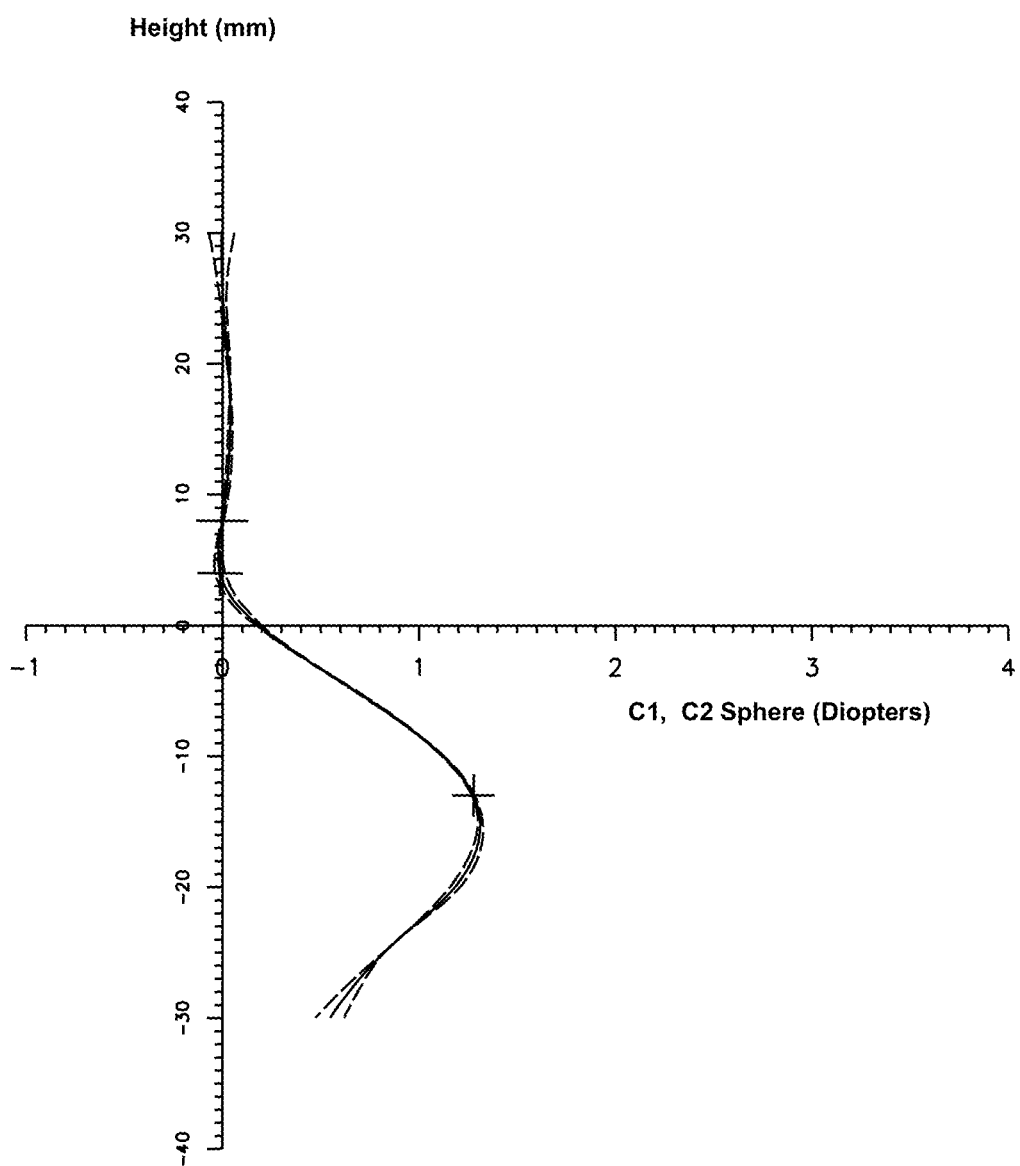
Figure 7:
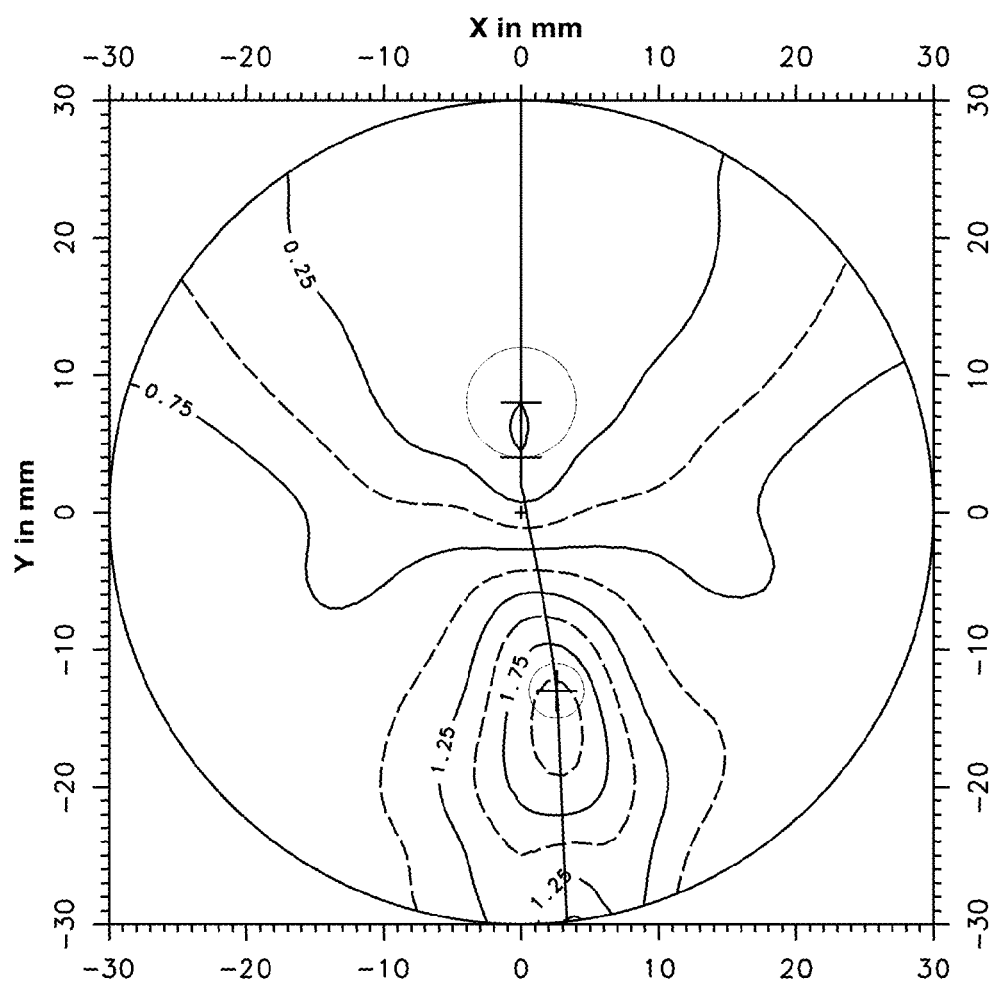
FIGS. 7 to 9 are graphical representations of the surface characteristics of the front surface of the lens 2, using the same conventions as in FIGS. 4 to 6.
Figure 8:
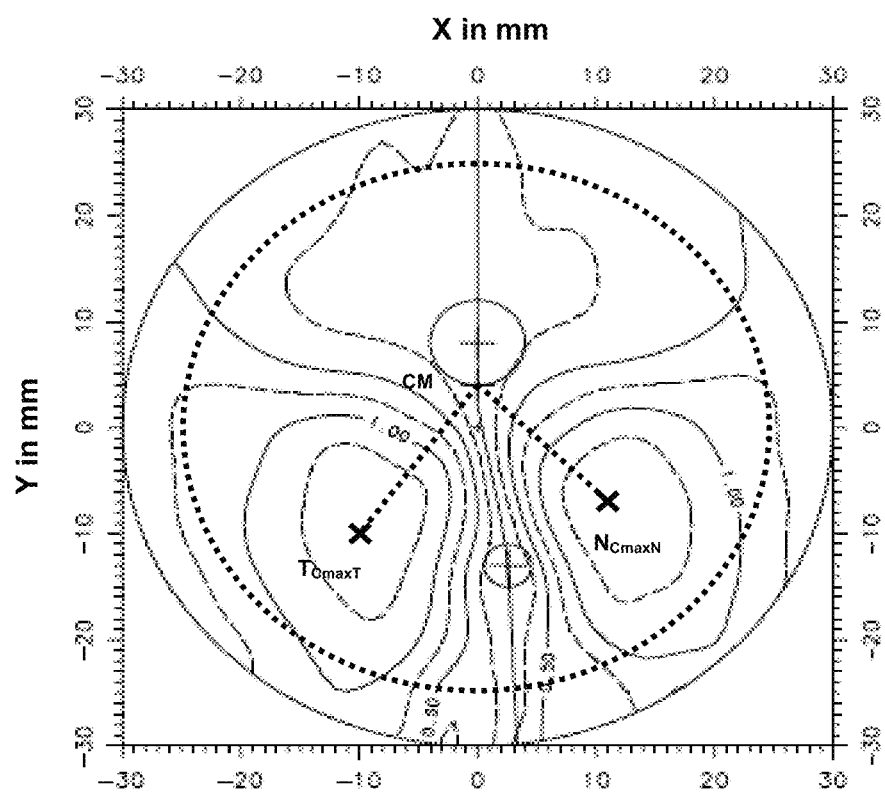
Figure 9:
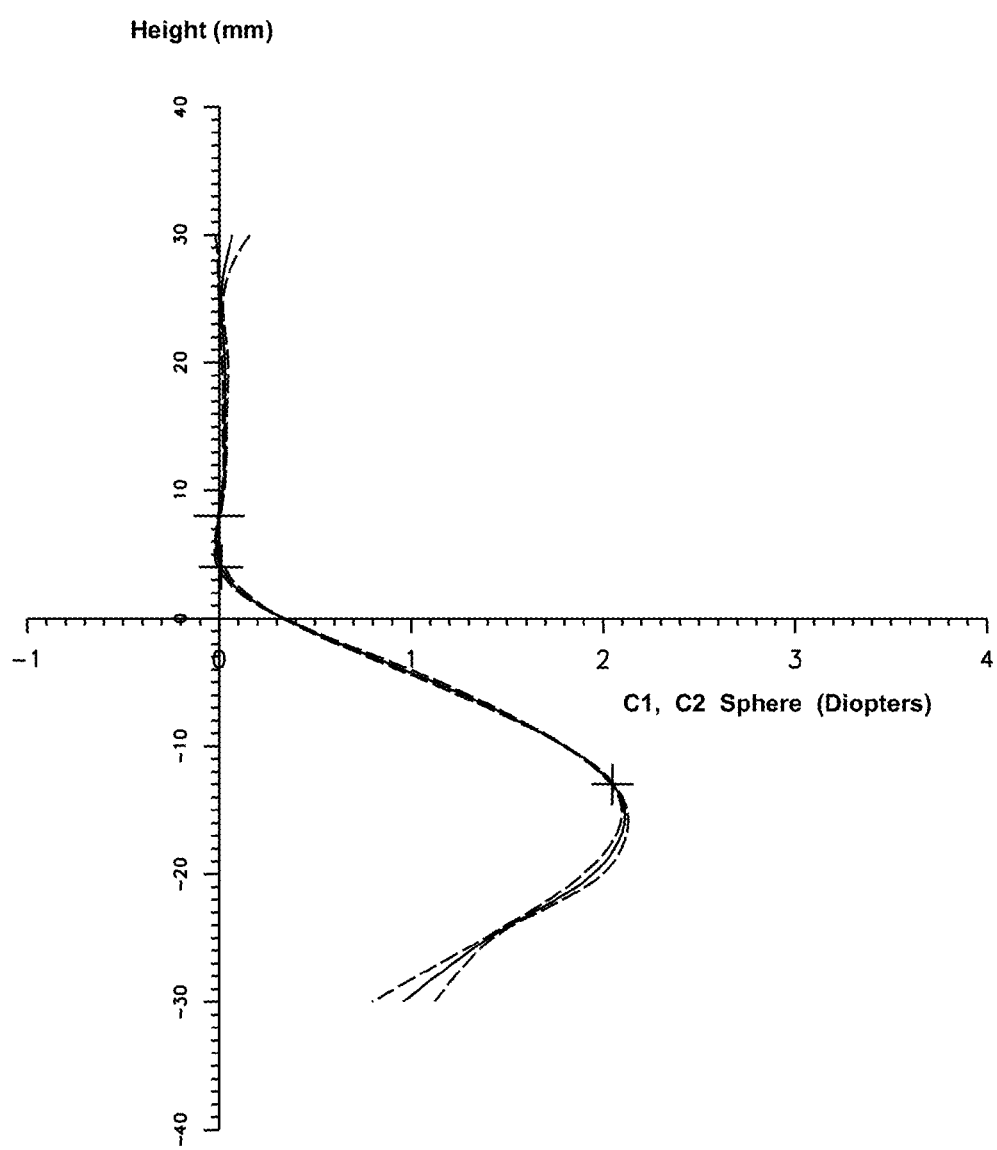
Figure 10:
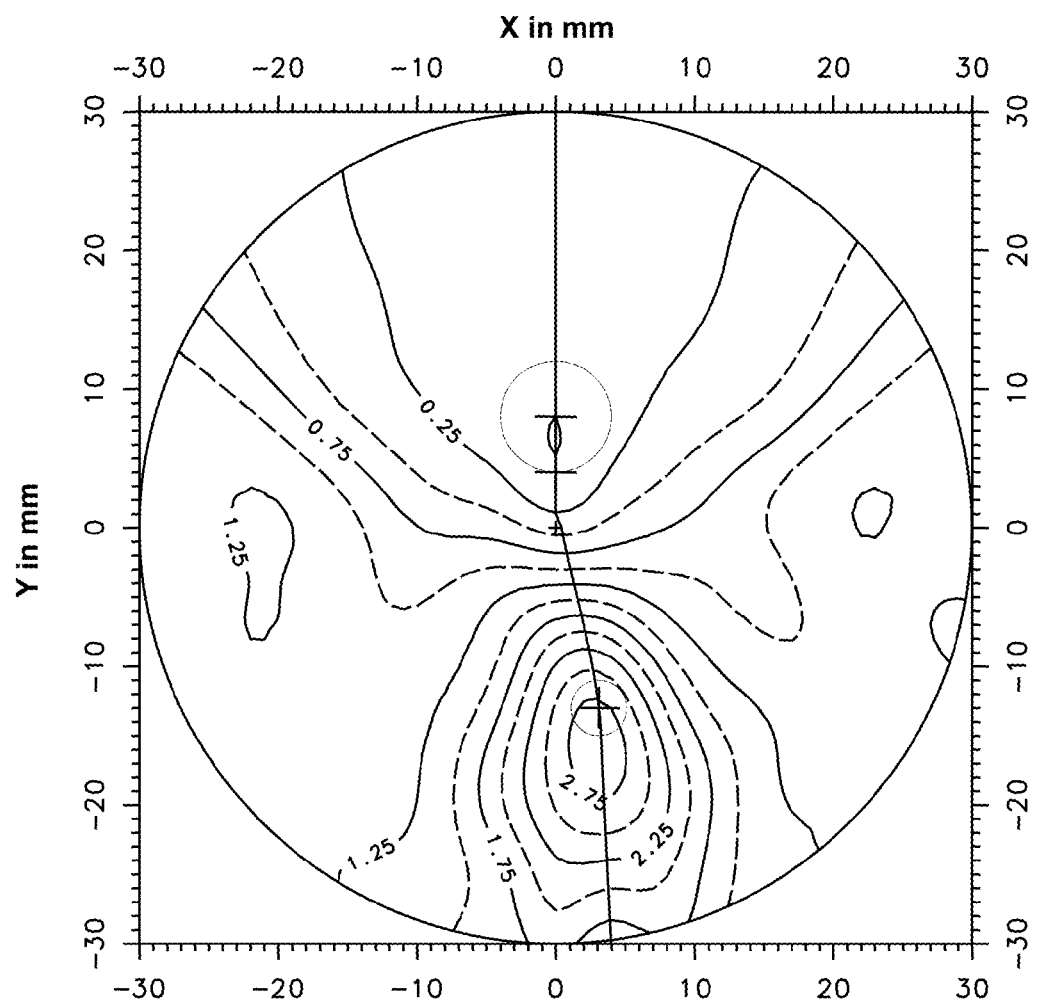
FIGS. 10 to 12 show graphic representations of the surface characteristics of the front surface of the lens 3, with the same conventions as in FIGS. 4 to 6.
Figure 11:
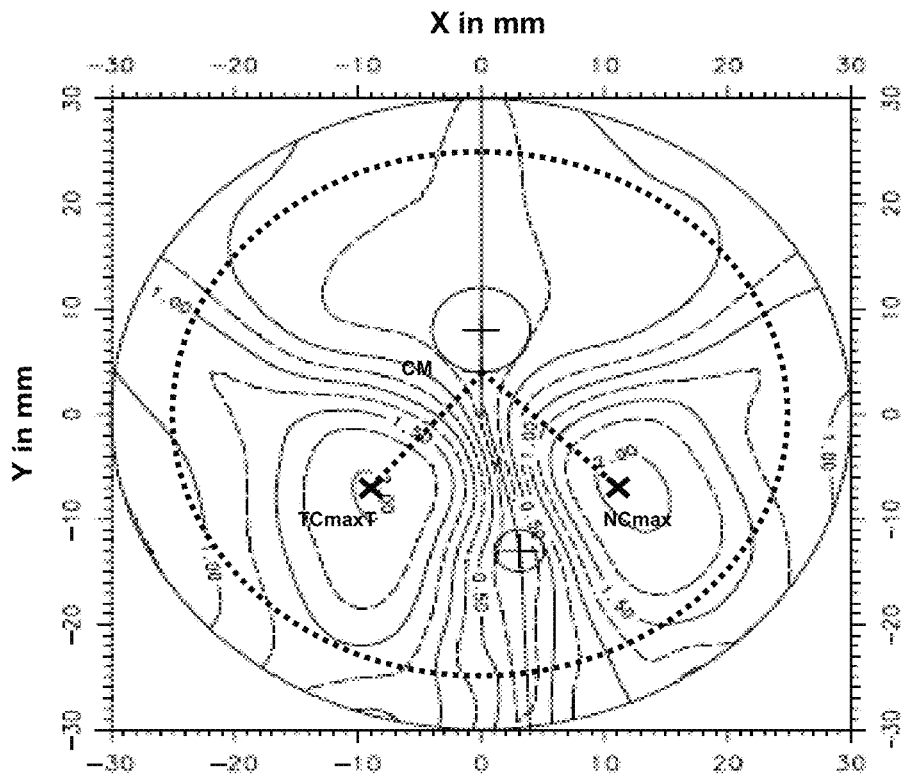
Figure 12:
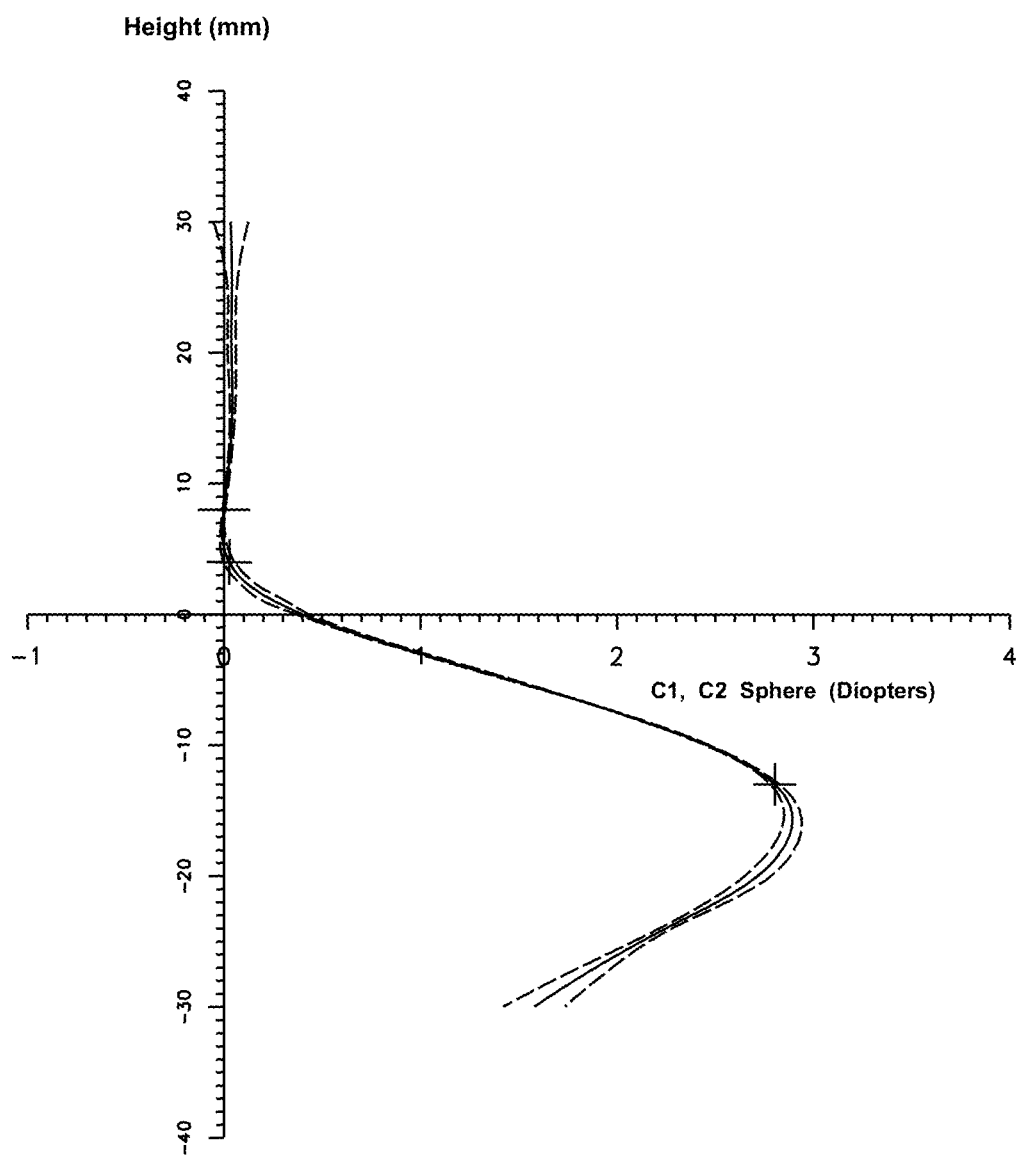

We shall consider a progressive multifocal ophthalmic lens for a wearer for whom an addition has been prescribed. The lens has, for each direction of gaze, a power and a resultant astigmatism for standard wearing conditions, each direction of gaze corresponding to an angle α of lowering and an azimuth angle β as defined above with reference to FIGS. 1 to 3. The lens has a fitting cross $C_M$ corresponding to a primary direction of gaze having an angle of lowering of gaze equal to zero and an azimuth angle of zero. The lens includes a far vision region having a far vision reference point for far vision corresponding to a reference direction of gaze for far vision, a near vision region comprising a reference point for near vision corresponding to a reference direction of gaze for near vision. The lens further comprises an intermediate vision region situated between the far vision region and the near vision region and a main meridian of progression passing through the three regions and separating the lens into a temporal region and a nasal region.

The lens satisfies a first condition we call "optical condition 1". According to "optical condition 1", the lens has a progression length of less than 29°. Optical condition 1 is consequently the expression in optical terms of surface condition 1 which is expressed in surface terms. When considering progression length from an optical point of view, it is defined as the angular difference between the primary direction of gaze and the angle of lowering of gaze passing through the meridian and for which wearer optical power variation when compared to wearer optical power value at the reference point for far vision reaches 85% of the prescribed addition. Such a definition is the optical expression of the surface definition previously discussed in reference to surface condition 1. This makes it possible to improve wearer comfort when compared to the eye-head vertical strategy, the eye not having to move as much in the vertical direction in order to obtain the correction appropriate to his or her near vision. This effect is further increased if the lens satisfies an "optical condition 1bis", that is to say, if the lens has a progression length less than 27°.

The lens satisfies a second condition we call "optical condition 2". We define a first specific direction $D_{AmaxN}$ for which resultant astigmatism is a maximum resultant value of astigmatism for all directions of gaze passing through the nasal region and through an angular disc of diameter 100° centered on the primary direction of gaze. The directions of gaze passing through this disc have an angle of lowering and an azimuth angle such that $\sqrt{\alpha^2 + \beta^2} \leq 100°$. This specific first direction $D_{AmaxN}$ corresponds to a first angle of lowering of gaze denoted $\alpha_1$ and a first azimuth angle denoted $\beta_1$.

We further define a second specific direction $D_{AmaxT}$ for which the resultant astigmatism is a maximum value of resultant astigmatism for all directions of gaze passing through the temporal region and the angular disc. This second specific direction corresponds to a second angle denoted $\alpha_2$ of lowering of gaze and a second azimuth angle denoted $\beta_2$. When we say that a lens satisfies "optical condition 2" we mean that the lens has a first ratio between maximum slope of resultant astigmatism and the prescribed addition which is less than 0.043 per degrees for certain direction of gaze defined as directions passing through:

the nasal region and having an angle of lowering of gaze α and an azimuth angle β such that the absolute value of the azimuth angle β is less than the absolute value of the first azimuth angle $\beta_1$ in absolute value and such that the product of the first angle of lowering of gaze $\alpha_1$ and the azimuth angle β is equal to the product of the first azimuth angle $\beta_1$ and the angle α of lowering of gaze. This can be expressed in equation form by a direction of angle of lowering of gaze α and an azimuth angle β passing through the nasal region as:

$$\begin{cases} |\beta| \leq |\beta_1| \\ \beta\alpha_1 = \beta_1\alpha \end{cases} \quad (1)$$

the temporal region and having an angle α of lowering of gaze and an azimuth angle β such that the absolute value of the azimuth angle β is less than the absolute value of the second azimuth angle $\beta_2$ and such that the product of the second angle of lowering of gaze $\alpha_2$ and azimuth angle β is equal to the product of the second azimuth angle $\beta_2$ and the angle of lowering α. This can be expressed in equation form by a direction of an angle of lowering α and an azimuth angle β passing through the temporal region as:

$$\begin{cases} |\beta| \leq |\beta_2| \\ \alpha_2\beta = \beta_2\alpha \end{cases} \quad (2)$$

This first ratio will be referred to hereinafter as Roptique2. Optical condition 2 is consequently an expression in optical terms of surface condition 2 which is expressed in terms of surface. Such a condition helps to limit variations in slope of resultant astigmatism at the edge of the far vision region, which improves dynamic vision, while facilitating the transition from the far vision region to the intermediate vision region. Wearer comfort is thereby increased. This effect is further increased if the lens satisfies an "optical condition 2bis", that is to say if the lens has a first ratio Roptique2 less than or equal to 0.038 per degree.

The lens also satisfies a third optical condition 3. According to "optical condition 3", the lens has a second ratio between, firstly, the maximum value of resultant astigmatism for all directions of gaze passing through the disc and, secondly, the prescribed addition less than or equal to 1. This second ratio is denoted Roptique3. Optical condition 3 is consequently an expression in optical terms of surface condition 3 which is expressed in terms of surface. This makes it possible to control resultant astigmatism on the disc. Aberrations notably resultant astigmatism from the defect in power within this disc are consequently reduced. The wearer's vision over this disc is consequently improved. This makes for better wearer comfort. This effect is still further enhanced if the lens satisfies an "optical condition 3bis", in other words if the lens has a second ratio Roptique3 less than or equal to 0.85.

The lens of the invention therefore satisfies optical conditions 1, 2 and 3 as defined above. This combination allows the lens to provide a soft transition between the far vision region and the intermediate vision region without degrading performance. Wearer comfort is further improved. Particularly, adaptation to the lenses is easier in the case of a lens with a soft transition between the far vision region and the intermediate vision region.

The lens can also satisfy a fourth condition we shall call "optical condition 4". According to "optical condition 4", the lens has a difference in ratio denoted Doptique4 between the value of resultant astigmatism and prescribed addition of less than 0.3 in absolute value for any pair of directions of gaze symmetric with respect to the primary direction of gaze angle having a zero angle of lowering of gaze and an azimuth angle less than 52° in absolute value. By the expression resultant astigmatism we mean the difference between prescribed astigmatism and the astigmatism produced by the lens. Optical condition 4 is consequently the expression, in optical terms, of surface condition 4 which is expressed in terms of surface. This makes it possible to provide a certain degree of symmetry of the distribution of resultant astigmatism for directions of gaze having the same lowering of gaze as the direction of gaze passing through the fitting cross. This also makes it possible to improve binocular vision for the wearer in far vision. Such a condition thus makes it possible to provide optimum comfort for the wearer in far vision. In effect, when the wearer is looking into the distance and slightly offsetting the eyes in the horizontal sense, he or she will be looking through the nasal region of one lens with one eye and through the temporal region of the other lens with the other eye. Now, good binocular balance is obtained if the quality is perceived substantially the same for each eye. Such a situation corresponds to optical aberrations perceived which are substantially identical for both eyes. By guaranteeing that the resultant astigmatism values normalized to prescribed addition are substantially symmetrical at one and the other side of the fitting cross, the wearer's left eye and right eye will encounter substantially the same optical defects. Good perceived balance between the two eyes in far vision is thus assured considering that the horizontal region at fitting cross level is the one on which the heaviest demands are made by a wearer who is focusing on a point in far vision, while at the same time shifting his or her eyes laterally. Such an effect is still further improved if the lens satisfies an "optical condition 4bis", in other words if the lens has a difference in ratio between the value of resultant astigmatism and prescribed addition of less than 0.1 in absolute value for every pair of directions of gaze symmetrical with respect to the primary direction of gaze and having an angle of lowering of gaze equal to zero and an azimuth angle less than 52° in absolute value.

Such a lens satisfying the optical conditions 1, 2, 3 and 4 as defined above has therefore improved comfort compared to an optical lens satisfying conditions 1, 2 and 3.

As an illustration, lenses 4, 5 and 6 will be studied. The lens 4 has a power addition of 1.25 diopters, lens 5 has an addition of 2.00 diopters and lens 6 has an addition of 2.75 diopters. These addition values correspond to the additions prescribed. In Examples 4, 5 and 6, the complex surface is divided between the two faces but it will be understood that the complex surface can be incorporated only into the front face of the lens or into the rear face of the lens.

Figure 13:
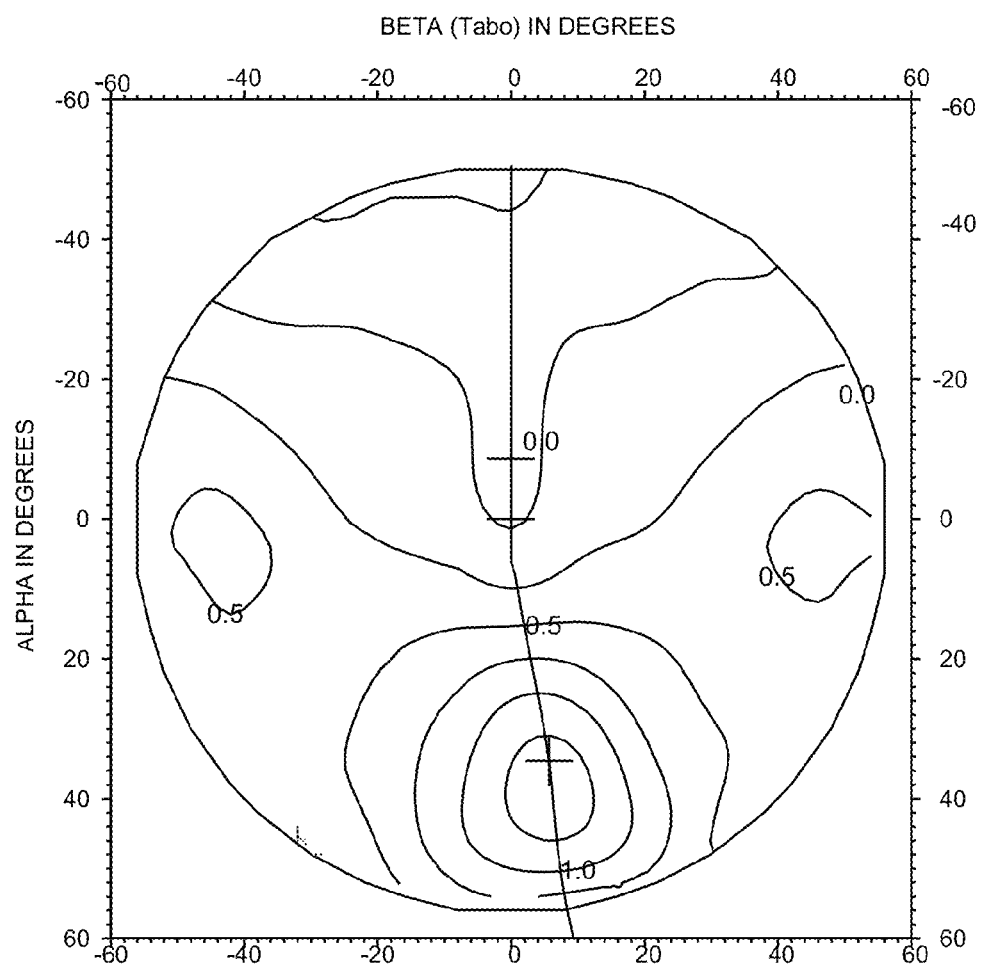
Figure 14:
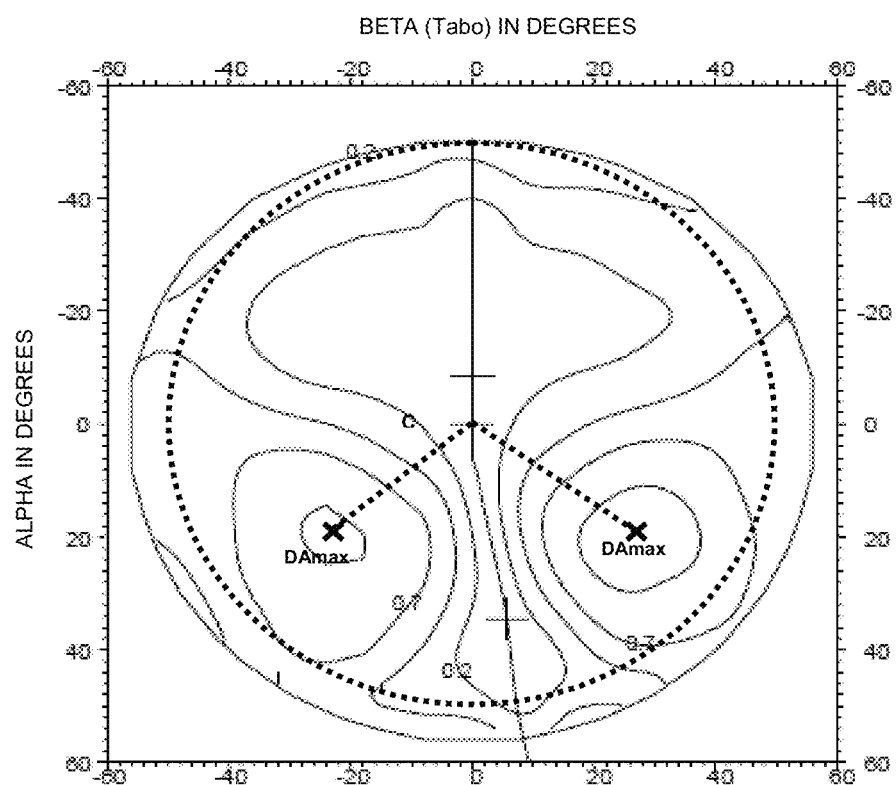
Figure 15:
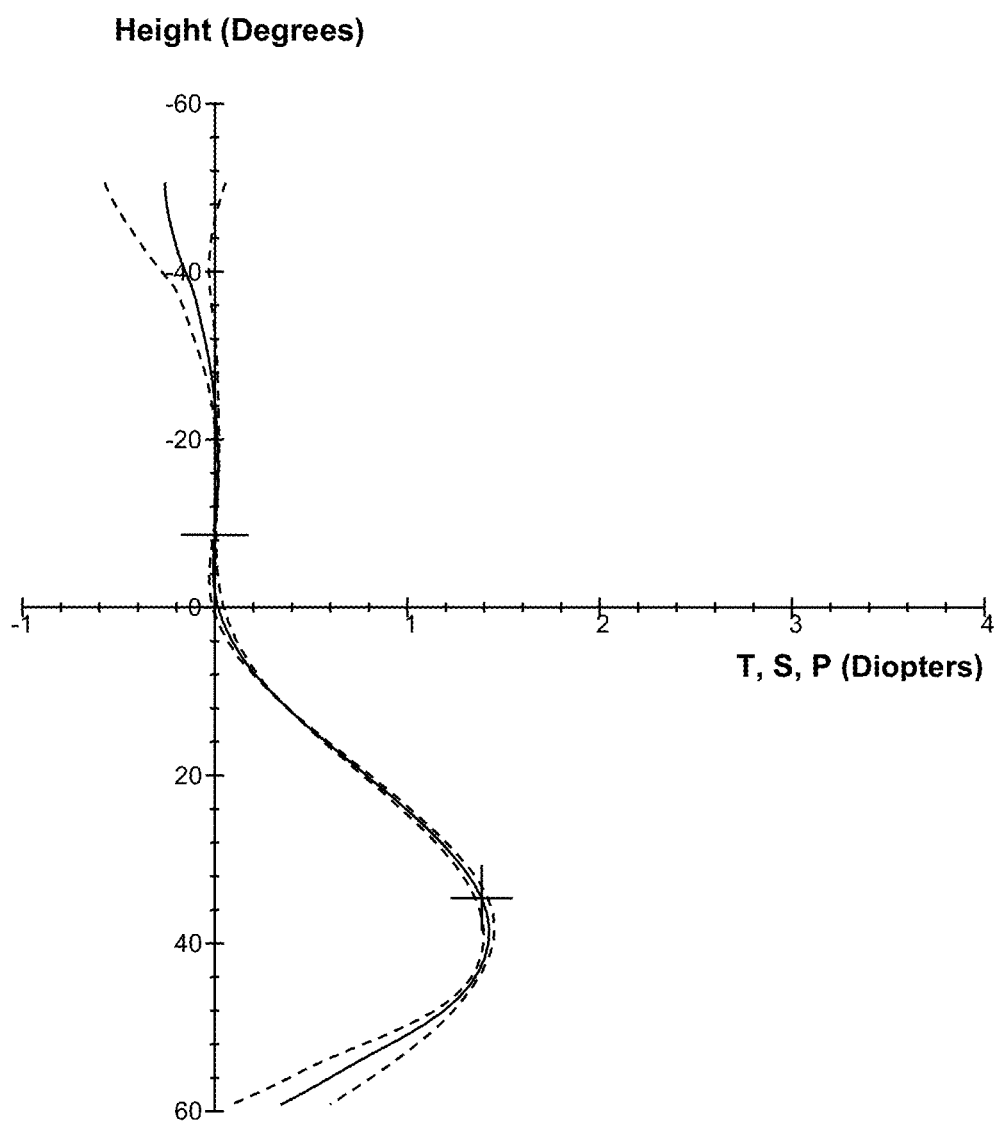

The optical characteristics presented below in FIGS. 13 to 15 were obtained by calculation. FIGS. 13 to 15 show graphic representations of the optical characteristics of the lens 4. FIG. 13 is a graphical representation of lines of equal power, i.e. corresponding to the directions of gaze having equal power value. The x and y-axes show respectively the angles β and α as defined above. FIG. 13 consequently provides a view of power defect mapping. FIG. 14 shows, with the same axes, lines of equal resultant astigmatism. FIG. 14 is consequently a graphical representation of resultant astigmatism. FIG. 15 shows power along the meridian, using the definition of power given above. The values on the x-axis are graduated in diopters, and the values on the y-axis give the lowering of the direction of gaze; the solid line shows power, and the dashed lines the quantities 1/JT and 1/JS defined in FIG. 2, for object distances corresponding to an ergorama representative of the distances of object points in each direction of gaze and simulating a mean object space. FIG. 15 consequently allows us to see power defect and resultant astigmatism along the meridian.

On FIG. 14 the first and second specific directions $D_{AmaxN}$ and $D_{AmaxT}$ are identified. Also shown in FIG. 14 is a 100° diameter circle centered on the fitting cross and two segments, one segment connecting the fitting cross to the first specific direction inside the nasal region and a segment connecting the fitting cross to the second specific direction inside the temporal region.

Figure 16:
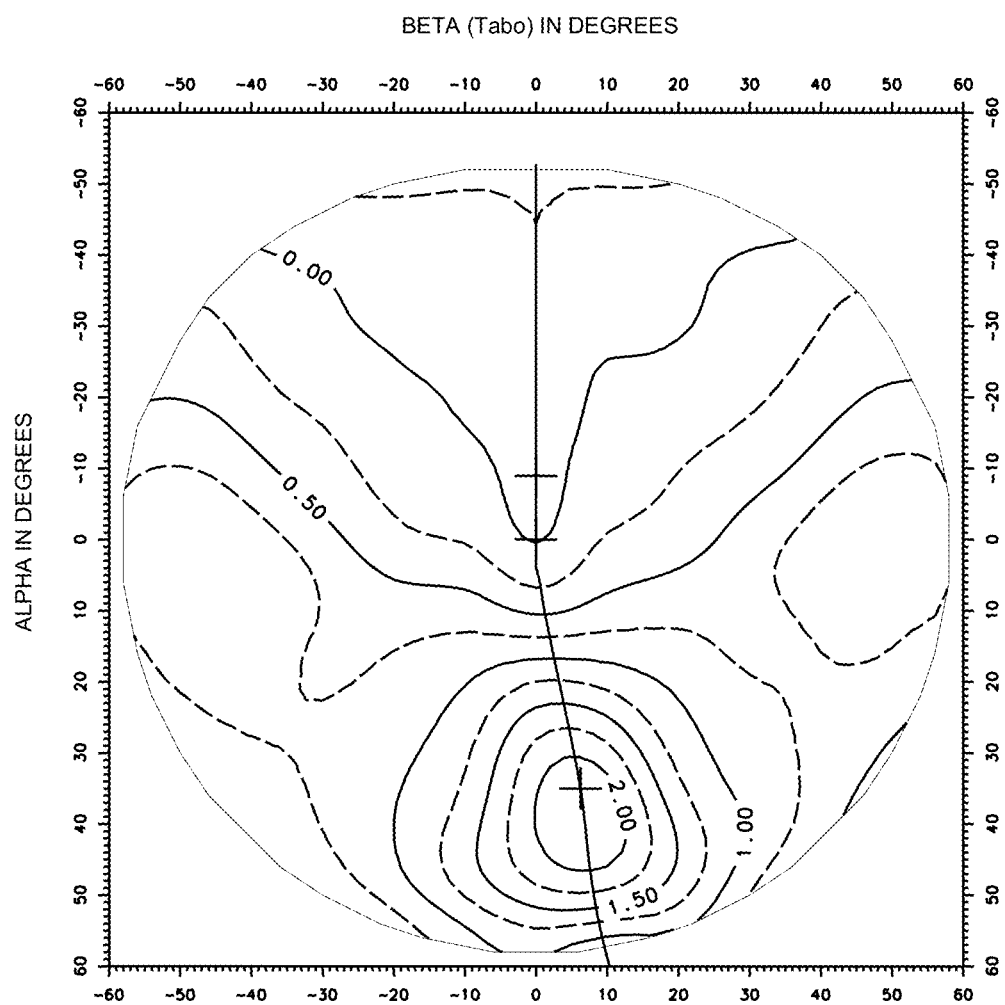
Figure 17:
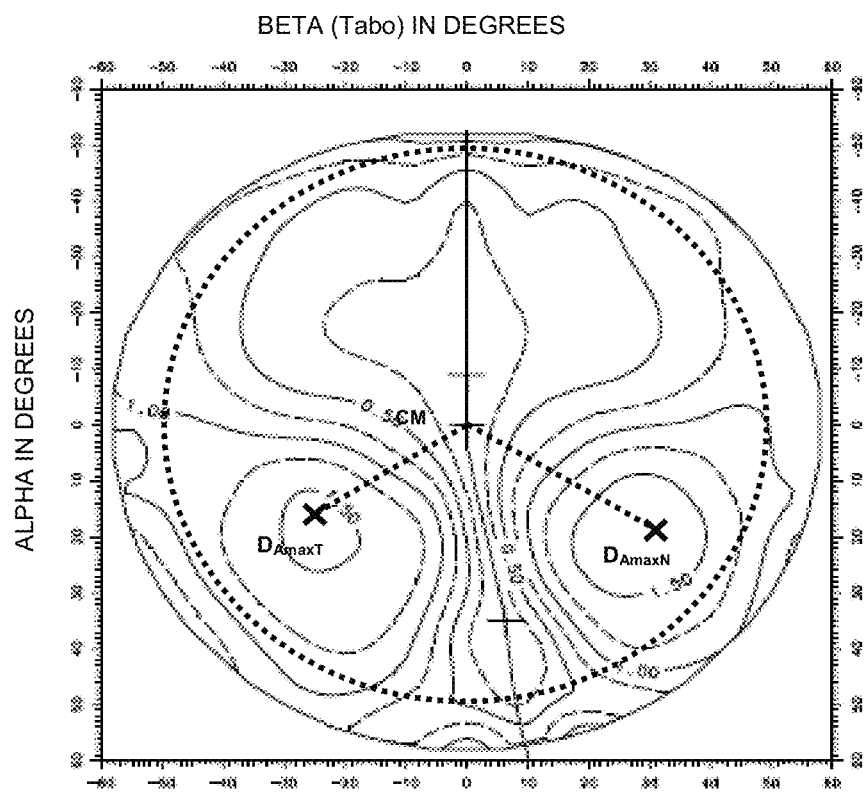
Figure 18:
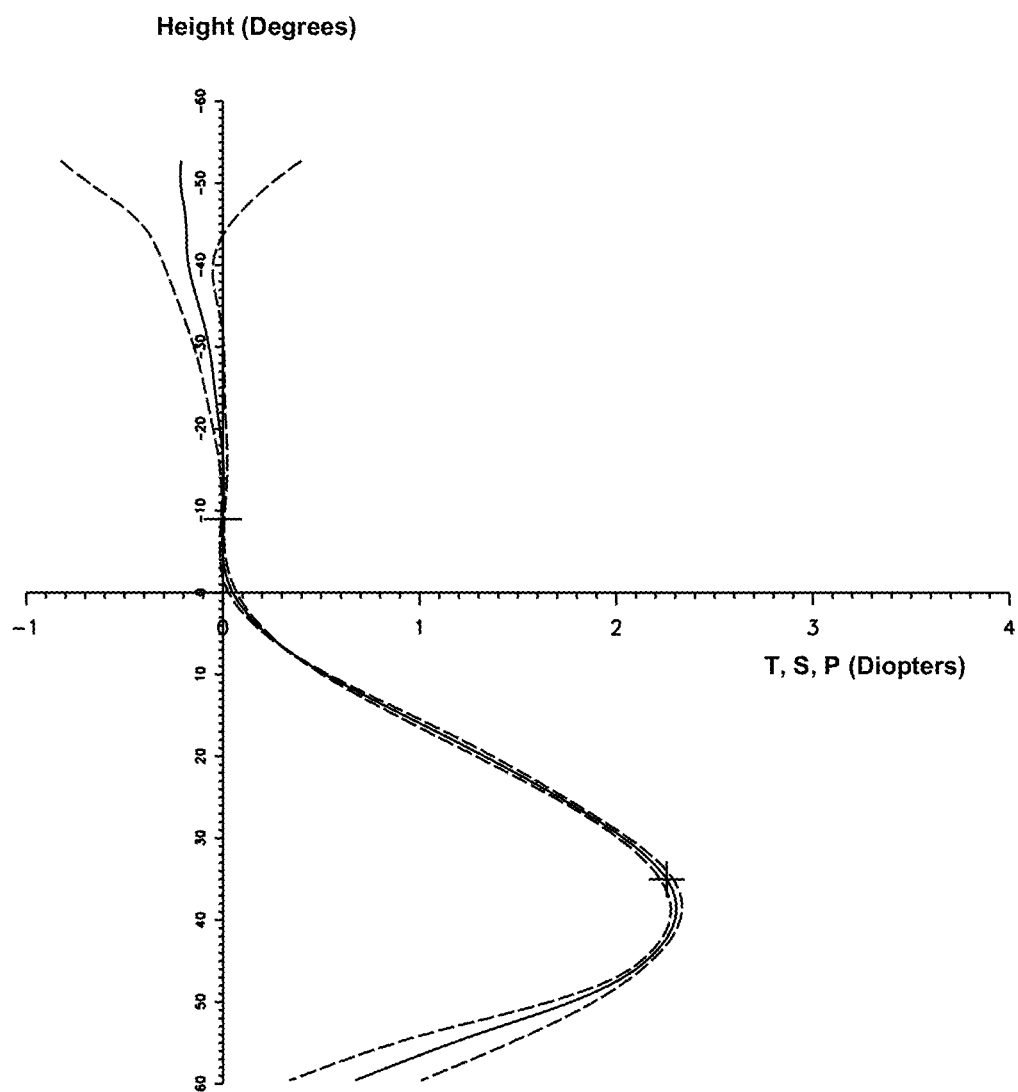

FIGS. 16 to 18 show graphic representations of the optical characteristics of the lens 5, with the same conventions as in FIGS. 13 to 15. FIG. 17 includes the same circles and segments as those shown in FIG. 14.

Figure 19:
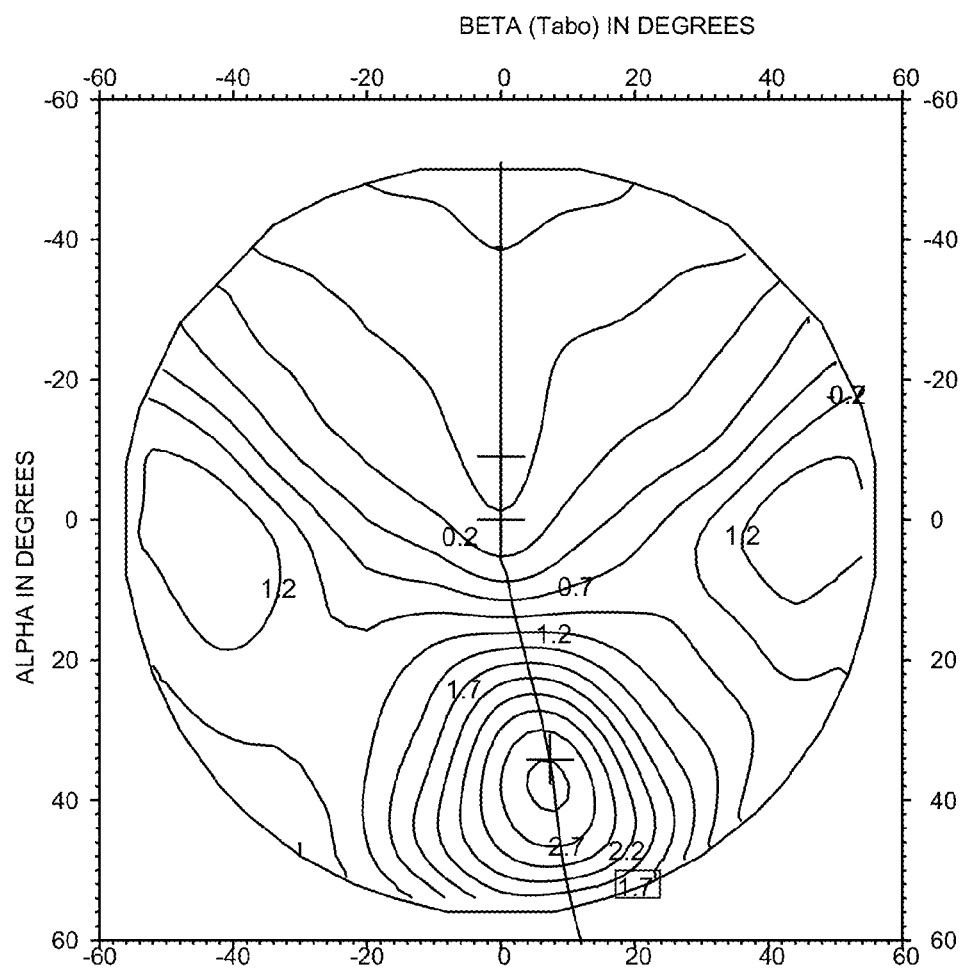
Figure 20:
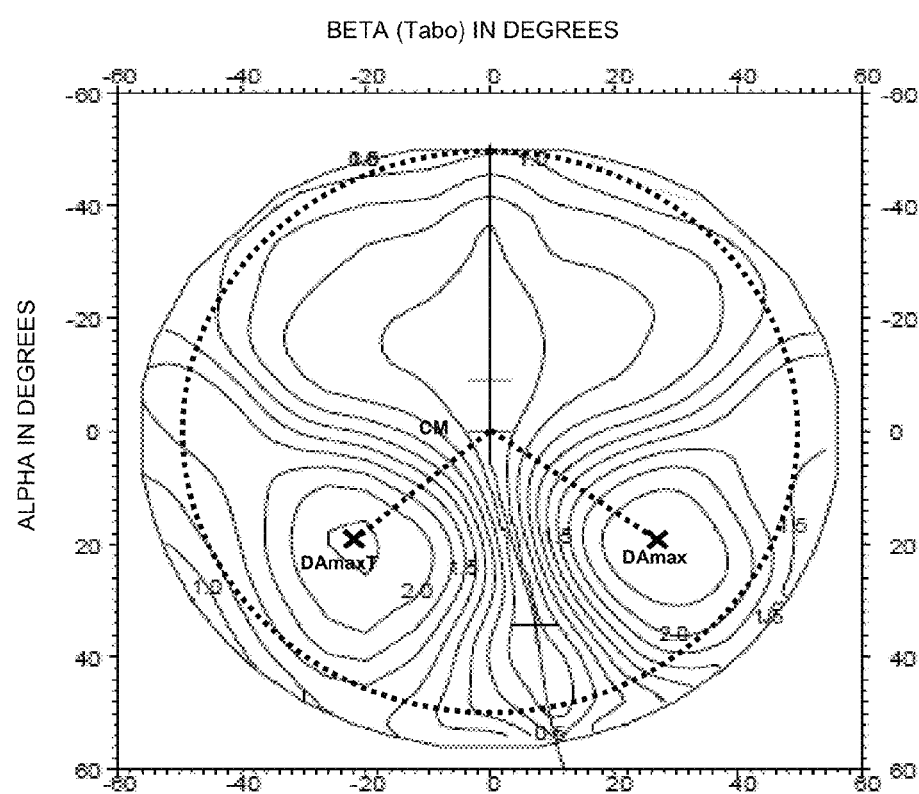
Figure 21:
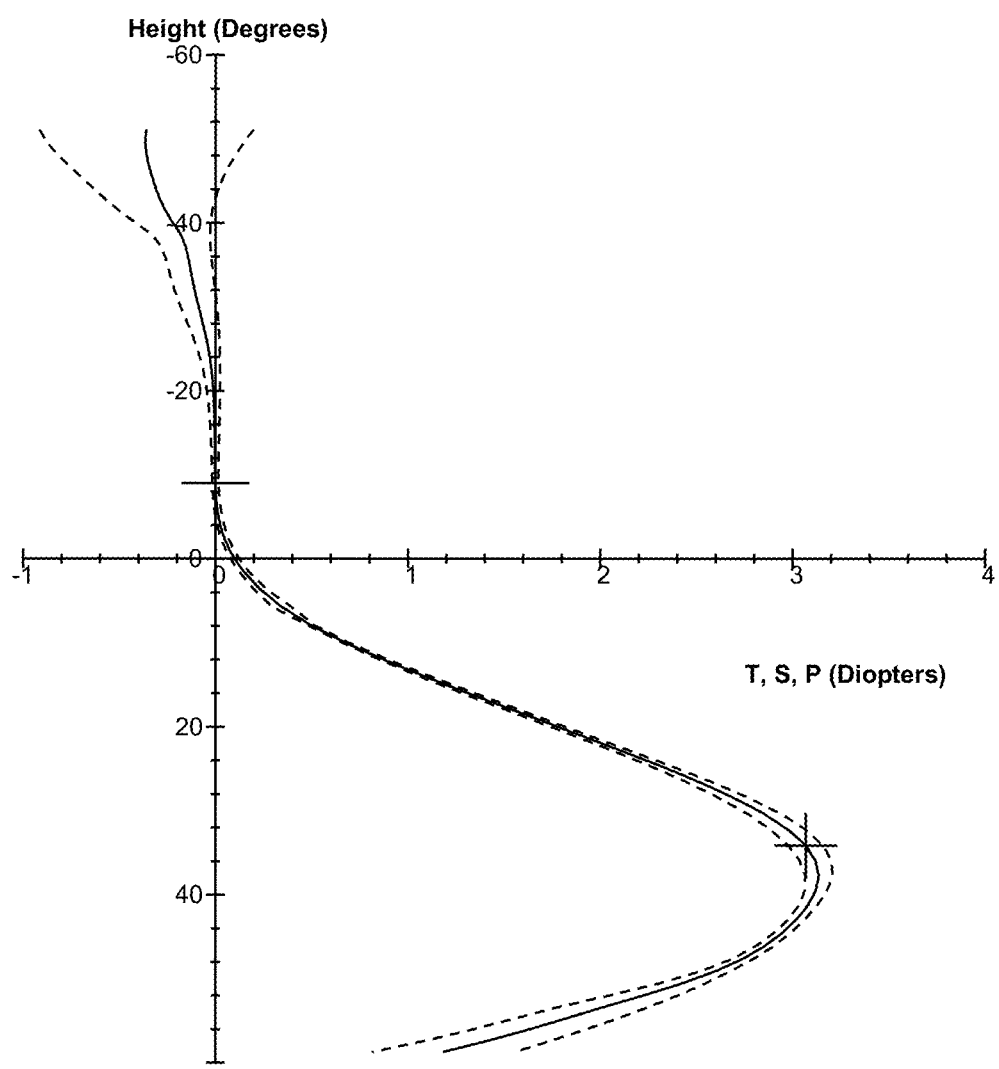

FIGS. 19-21 show graphic representations of the optical characteristics of the lens 6, with the same conventions as in FIGS. 13 to 15. FIG. 20 includes the same circles and segments as shown in FIGS. 14 and 17.

Table 4 shows the values of progression lengths for three examples of lenses.

TABLE 4

Value for progression length for three examples of lenses.

| Example of lens considered | Lens Type | Addition | Progression length (°) |
|---|---|---|---|
| Example 4 | finished lens | 1.25 diopters | 26.3 |
| Example 5 | finished lens | 2.00 diopters | 25.8 |
| Example 6 | finished lens | 2.75 diopters | 25.7 |

For each of Examples 4 to 6, the progression length is less than 29°. Optical condition 1 is consequently well satisfied by the lenses of the examples considered. In addition, the lenses of Examples 4 to 6 have a progression length less than 27°, so they satisfy optical condition 1bis and bring the wearer greater comfort for accessing near vision.

Furthermore, the values of the characteristic ratios denoted Roptique2 for optical condition 2 and denoted Roptique3 for optical condition 3 are given in Table 5 for the examples of lenses 4, 5 and 6.

TABLE 5

Roptique2 and Roptique3 ratios for three examples of lenses.

| Example of lens considered | Addition prescribed | Roptique2 | Roptique3 |
|---|---|---|---|
| Example 4 | 1.25 diopters | 0.04/° | 0.86 |
| Example 5 | 2.00 diopters | 0.037/° | 0.82 |
| Example 6 | 2.75 diopters | 0.043/° | 0.88° |

For each of Examples 4, 5 and 6, the ratio Roptique2 is less than 0.043 per degree (0.043/°). Optical condition 2 is thus well satisfied in the lenses of the examples considered. The lenses considered as examples therefore have facilitated transition between the far vision region and the intermediate vision region.

Ratio Roptique3 is also less than 1. The optical condition 3 is well satisfied by the lenses of the examples considered.

The three examples of lenses considered therefore do satisfy the combination of optical conditions 1, 2 and 3.

In addition, the lens of Example 5 has a ratio Roptique2 of less than 0.038 per degrees. This means that the lens of Example 5 additionally satisfies optical condition 2bis and has further improved comfort with respect to a lens whose surface satisfies optical conditions 1, 2 and 3.

The lens of Example 5 also exhibits a ratio Roptique3 of less than 0.85. This means that the lens of Example 5 also satisfies optical condition 3bis and shows further improved comfort compared to a lens whose surface satisfies optical conditions 1, 2 and 3.

Table 6 also shows maximum value, denoted Doptique4, of difference in ratio between the value of resultant astigmatism and prescribed addition in absolute value for any pair of directions of gaze that are symmetrical with respect to the primary direction of gaze and having an angle of lowering of gaze equal to zero and an azimuth angle less than 52° in absolute value for each one of the three examples of lenses.

TABLE 6

Value of Doptique4 for three examples of lenses.

| Example of lens considered | Lens Type | Addition | Doptique4 |
|---|---|---|---|
| Example 4 | finished lens | 1.25 diopters | 0.059 |
| Example 5 | finished lens | 2.00 diopters | 0.066 |
| Example 6 | finished lens | 2.75 diopters | 0.085 |

For each of Examples 4 to 6, the maximum value Doptique4 is less than 0.3. Optical condition 4 is consequently well satisfied by the lenses of the examples considered. In addition, the lenses of the examples also satisfy the condition optical 4bis with a maximum value less than 0.1.

The combination of the various conditions described above is not satisfied by any of the multifocal ophthalmic lenses of the prior art tested by the applicant. This applies both to optical characterization and to surface characterization.

As regards surface characterization, the combinations discussed above make it possible to define a surface carried by a semi-finished lens. In the case of a finished lens, the combinations of characteristics expressed in optical or in surface terms make it possible to improve comfort of the wearer wearing the lens.

Regardless of whether the lenses are finished or semi-finished, they can be part of visual equipment for improving wearer comfort of the visual equipment.

Additionally, the lenses disclosed above can be determined using determination procedures. They can be implemented in the framework of an ophthalmic lens optimization procedure intended for a wearer of known prescription. This optimization procedure can be the one disclosed in European patent EP 0,990,939 or EP 1,920,291. Thus, as will be known by the person skilled in the art, the surface of progressive lenses is obtained using digital optimization with the aid of a computer, by setting conditions on the limits for a certain number of lens parameters. One or more of the criteria defined above can be employed as limiting conditions.

The invention claimed is:

1. A complex surface of a progressive multifocal ophthalmic lens having at every point thereon a value of mean sphere and a value of cylinder, the surface comprising:
    a far vision region having a reference point for far vision;
    a near vision region having a reference point for near vision;
    a surface addition defined as a difference in mean sphere between the reference point for near vision and the reference point for far vision;
    an intermediate vision region between the far vision region and the near vision region;
    a main meridian of progression passing through the three regions and dividing the surface into a temporal region and a nasal region, a portion on the meridian passing through the far vision region defining a vertical axis;
    a fitting cross;
    a prism reference point in the center of a segment connecting micro-engravings, the prism reference point defining, with the vertical axis of the meridian and a horizontal axis connecting the micro-engravings, a reference frame, the reference frame making it possible to define each of the points on the lens by a value on a y-axis relative to the vertical axis and a value on an x-axis relative to the horizontal axis, the prism reference point having a value of zero on the x-axis and on the y-axis;
    a disc grouping together all points on the lens having the same value on the x-axis and the same value on the y-axis as points situated within a circle in a plane of the reference frame of 50 mm diameter and centered on the prism reference point;
    a progression length less than 14.5 mm, the progression length being defined as a difference between a value on the y-axis of the fitting cross and a value on the y-axis of the point on the meridian where variation in mean sphere with respect the value of mean sphere at the reference point for far vision reaches 85% of surface addition;
    a difference in ratio between value of cylinder and surface addition is less than 0.2 in absolute value for every pair of points on the lens symmetrical with respect to the fitting cross and having the same y-axis value as the fitting cross, and an x-axis value less than 20 millimeters in absolute value;
    a first specific point having a value of cylinder equal to a maximum cylinder value from among the set of points on the lens located inside the nasal region and within the disc;
    a second specific point having a value of cylinder equal to a maximum cylinder value from among the set of points on the lens located inside the temporal region and within the disc;
    a first ratio between a maximum slope of cylinder for points on the lens having the same value on the x-axis and the same value on the y-axis as the points on segments connecting the fitting cross to the first and second specific points and the surface addition which is less than 0.095 per millimeter, and
    a second ratio between the maximum value of cylinder for the first and second specific points and the surface addition which is less than or equal to 0.85.

2. The surface according to claim 1, wherein the difference in ratio between the value of cylinder and the surface addition is less than 0.1 in absolute value for each pair of points on the lens that are symmetrical with respect to the fitting cross and having the same value on the y-axis as the fitting cross and the x-axis value less than 20 millimeters in absolute value.

3. The surface according to claim 1, wherein the first ratio is less than 0.090 per millimeter.

4. The surface according to claim 1, wherein the second ratio is less than or equal to 0.75.

5. The surface according to claim 1, wherein the progression length is less than 13.5 millimeters.

6. The surface according to claim 1, wherein the lens is a finished or semi-finished lens.

7. A visual equipment including a lens according to claim 1.

8. A progressive multifocal ophthalmic lens for a wearer for whom an addition has been prescribed, the lens comprising:
    for each direction of gaze, a power and a resultant astigmatism for standard wearing conditions, each direction of gaze corresponding to an angle of lowering of gaze and an azimuth angle;
    a far vision region having a reference point for far vision corresponding to a reference direction of gaze for far vision;
    a near vision region having a reference point for near vision corresponding to a reference direction of gaze for near vision;
    an intermediate vision region between the far vision region and the near vision region;
    a main meridian of progression passing through the three regions and dividing the lens into a temporal region and a nasal region;

a fitting cross corresponding to a primary direction of gaze having an angle of lowering of gaze equal to zero and an azimuth angle of zero;

a progression length less than 29°, the progression length being defined as a difference in angle between a primary direction of gaze and an angle of lowering of gaze passing through the meridian for which wearer optical power variation with respect to wearer optical power value at the reference point for far vision reaches 85% of the prescribed addition;

a first direction for which resultant astigmatism is a maximum resultant astigmatism value for a complete set of directions of gaze passing through the nasal region and through an angular disc of diameter 100° centered on the primary direction of gaze, the first direction having a first angle of lowering of gaze and a first azimuth angle;

a second direction for which resultant astigmatism is a maximum resultant astigmatism value for a complete set of directions of gaze passing through the temporal region and through the disc, the second direction having a second angle of lowering of gaze and a second azimuth angle;

a first ratio between a maximum slope of resultant astigmatism and the prescribed addition is less than 0.043 per degrees for direction of gaze passing through the nasal region and having an angle of lowering of gaze and an azimuth angle such that the absolute value of the azimuth angle is less than the absolute value of the first azimuth angle and such that the product of the first angle of lowering of gaze and the azimuth angle is equal to the product of the first azimuth angle and the angle of lowering of gaze and the temporal region and having an angle of lowering of gaze and an azimuth angle such that the absolute value of the azimuth angle is less than the value of the second azimuth angle and such that the product of the second angle of lowering of gaze and the azimuth angle is equal to the product of the second azimuth angle and the angle of lowering of gaze; and a second ratio between a maximum value of resultant astigmatism for all the directions of gaze passing through the disc and the prescribed addition is less than or equal to 1.

9. The lens according to claim 8, wherein the first ratio is less than 0.038 per degree.

10. The lens according to claim 8, wherein the second ratio is less than or equal to 0.85.

11. The lens according to claim 8, wherein progression length is less than 27°.

12. The lens according to claim 8, further comprising:

a difference in ratio between the value of resultant astigmatism and the prescribed addition of less than 0.3 in absolute value for any pair of directions of gaze which are symmetrical with respect to the primary direction of gaze and having the angle of lowering of gaze of zero and the azimuth angle less than 52° in absolute value.

13. The lens according to claim 12, wherein the difference in ratio between the value of resultant astigmatism and prescribed addition is less than 0.1 in absolute value for any pair of direction of gaze which are symmetrical with respect to the primary direction of gaze and having the angle of lowering of gaze equal to zero and the azimuth angle less than 52° in absolute value.

14. A visual equipment including a lens according to claim 8.

* * * * *